(12) United States Patent
Horiuchi et al.

(10) Patent No.: US 9,639,517 B2
(45) Date of Patent: May 2, 2017

(54) WEB PAGE AUTHORING

(75) Inventors: Yoshio Horiuchi, Hiratsuka (JP);
Masabumi Koinuma, Yokohama (JP);
Mari (Kuroki) Onishi, Sagamihara
(JP); Masaki Saitoh, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1721 days.

(21) Appl. No.: 11/293,477

(22) Filed: Dec. 2, 2005

(65) Prior Publication Data
US 2006/0161841 A1 Jul. 20, 2006

(30) Foreign Application Priority Data
Dec. 2, 2004 (JP) ................................ 2004-350481

(51) Int. Cl.
*G06F 17/00* (2006.01)
*G06F 17/24* (2006.01)

(52) U.S. Cl.
CPC ................................ *G06F 17/248* (2013.01)

(58) Field of Classification Search
CPC ... G06F 17/212; G06F 17/211; G06F 17/2247
USPC .................... 715/234, 236, 239, 207; 710/67
See application file for complete search history.

(56) References Cited

U.S. PATENT DOCUMENTS

| | | | |
|---|---|---|---|
| 6,584,480 B1 * | 6/2003 | Ferrel et al. .................. | 715/205 |
| 7,051,276 B1 * | 5/2006 | Mogilevsky et al. ........ | 715/209 |
| 7,327,193 B2 * | 2/2008 | Clara et al. .................... | 330/258 |
| 7,392,510 B1 * | 6/2008 | Treder et al. .................. | 717/128 |
| 7,523,460 B2 * | 4/2009 | Popp et al. .................... | 719/315 |
| 2002/0133637 A1 * | 9/2002 | Popp et al. .................... | 709/315 |
| 2003/0120686 A1 * | 6/2003 | Kim et al. ...................... | 707/200 |
| 2004/0073871 A1 * | 4/2004 | Giannetti ....................... | 715/513 |
| 2004/0250204 A1 * | 12/2004 | Isaacson ........................ | 715/517 |
| 2005/0132285 A1 * | 6/2005 | Chen et al. .................... | 715/517 |
| 2005/0251742 A1 * | 11/2005 | Mogilevsky et al. ........ | 715/521 |
| 2005/0268230 A1 * | 12/2005 | Bales ............................. | 715/530 |
| 2006/0085765 A1 * | 4/2006 | Peterson et al. .............. | 715/853 |
| 2006/0174188 A1 * | 8/2006 | White .......................... | 715/501.1 |
| 2007/0083534 A1 * | 4/2007 | Uematsu et al. ............. | 707/101 |

(Continued)

FOREIGN PATENT DOCUMENTS

JP PUPA0756786 3/1995

OTHER PUBLICATIONS

Title: macromedia Dreamweavermx 2004, Getting Started with Dreamweaver Publish Date: First Edition Sep. 2003.*

(Continued)

*Primary Examiner* — Mustafa Amin
(74) *Attorney, Agent, or Firm* — Yee & Associates, P.C.; Richard A. Wilhelm

(57) ABSTRACT

The present invention improves application of a style to a view object when a document for a Web page to be edited is edited on a browser-type edit screen. First, a view object is detected from a managed document. Then, a direct style directly described in the managed document and an indirect style identified only by referring to an external document are collected. A browser-type edit screen is generated in which the direct and indirect styles are applied to each view object. The content of the managed document is synchronized with the edited content on the browser-type edit screen based on the editing operations on the browser-type edit screen.

15 Claims, 19 Drawing Sheets

(56) References Cited

U.S. PATENT DOCUMENTS

2009/0217153 A1* 8/2009 Oshima et al. ............... 715/234
2010/0058172 A1* 3/2010 Soldan et al. ................ 715/235

OTHER PUBLICATIONS

Author: Claus Augusti Title: Extending Dreamweaver: Let Dreamweaver Create Your Menues Date: Jul. 6, 2001.*
Title: Inside Dreamweaver MX Author: Gutman, Laura; Ayers, Patricia J.; Booth, Donald S. Date: Apr. 16, 2002 ISBN:7357-1181-X Accessed via Safari Books Online Url: <http://proquest.safaribooksonline.com/>.*
David Flanagan, JavaScript The definitive Guide, fourth edition, dated Jan. 2002, ISBN 0-596-00048-0, pp. 1-5.*
Toshiya, "Dreamweaver MX 2004 with Fireworks", Dec. 2004, pp. 1-34 www.macromedia.com/software/dreamweaver.
Ganci et al., "Rational Application Developer V6 programming Guide", IBM Redbooks, Jun. 2005, pp. 1-1460.

* cited by examiner

401

```
<HEAD>
<LINK href="mystyle.css" rel="stylesheet"
      type="text/css" />
<TITLE>sample1.jsp</TITLE>
</HEAD>
<BODY><H1>Web development environment</H1>
```

```
<LINK href="mystyle.css" rel="stylesheet"
      type="text/css" />
```

```
<HEAD>
<%@taglib uri="vct_test_offrendering"
    prefix="off"%>
<my:link href="mystyle.css" />
<TITLE>sample1.jsp</TITLE>
</HEAD>
<BODY><H1>Web development environment</H1>
```

715 — Web development environment

716 — Easy-to-use wizards and tools bring all aspects of Web application development (HTML, JavaServer7 Pages and servlets) into a common interface. Within the integrated Web development environment, Web site teams can collaborate, create, assemble, publish, deploy, and maintain dynamic, interactive Web applications. The Web development environment includes:

- Web Site Designer to visually create, import, and customize complete Web sites with consistent style and layout using a tree view of the site
717 — structure
- Page Designer visual layout tool with Visual Custom Tags for easy JSP and HTML file creation, validation editing, and debugging.

PRIOR ART

FIG. 20

WEB PAGE AUTHORING

FIELD OF THE INVENTION

The present invention relates to a Web page authoring apparatus, Web page authoring method, and program for editing Web pages, and more particularly to a Web page authoring apparatus, Web page authoring method, and program with an improved Web page edit screen.

This application claims priority based on Japan Patent Application Serial No. 2004-350481, filed on Dec. 2, 2004.

BACKGROUND ART

Typical Web page documents are HTML documents, each of which is divided into head (HEAD) and body (BODY) sections. The head section provides document information, while the body section contains display content on a browser screen, including not only characters and images (where separator lines and borders are counted as images) but also information related to a style of the Web page (layout, character font, color, etc.).

Page Designer and Dreamweaver®, which are well-known as Web page authoring tools, provide an edit screen on which an HTML document can be displayed like a Web client's browser screen (hereinafter referred to as "browser-like edit screen"), as well as an edit screen for directly editing source code of the HTML document, so that an editor or author can edit the HTML document efficiently on the browser-like edit screen.

FIG. 20 shows a browser-like edit screen 711 in a conventional Web page authoring tool 710. A Web page document has default style values commonly applied to the Web page. In a Web page shown in FIG. 20, paragraphs 715, 716, and 717 are defined by the default style values, respectively. As for kinds of paragraphs, for example, a heading style is applied to paragraph 715, a normal style to paragraph 716, and a bullet list style to paragraph 717. The HTML document of the Web page displayed in the Web authoring tool 710 includes element names (tag names) in the body section to describe what kinds of styles are applied to the paragraphs 715, 716, and 717.

HTML can define in the body section a style of each view object appearing on a browser screen. There are two types of styles, direct and indirect. The direct style is a style whose existence is directly known from a document itself defining a view object to which the style is to be applied (see FIG. 13A to be described later). The indirect style is a style whose existence is known only after referring to an external document (e.g., CSS (Cascading Style Sheet)) described in a document defining a view object to which the style is to be applied (see FIG. 13B to be described later).

For example, suppose that there is such an indirect style as to set a text color of blue, a text color of green, and a background color of red for heading, normal, and bullet list paragraphs, respectively. In the browser-like edit screen 711 of the conventional Web page authoring tool 710, a direct style can be applied to a view object, but an indirect style cannot be applied, so that the browser-like edit screen 711 does not render the paragraphs 715, 716, and 717 with the text color of blue, text color of green, and background color of red, respectively.

A typical conventional Web page authoring tool has a preview screen to open a browser separately from the edit screen so that the author can see how the HTML document being edited is displayed in the browser. However, the preview screen is just to see the content of a Web page to be edited, and the author cannot edit the Web page to be edited on the preview screen.

Dreamweaver® as a well-known Web page authoring tool supports the back-end operation of an application server at the time of editing. In this case, since a JSP container is implemented in the server, an external document is processed using a custom tag or jsp:include tag. Therefore, a style set by the external file is reflected in the view object on the edit screen in such a manner that the edit screen shows the Web page document in a display state similar to that on an actual browser screen.

In the browser-like edit screen 711 of the conventional Web page authoring tool 710, the author may edit a document without knowing the existence of an indirect style for a view object of the document being edited, which would result in inappropriate editing.

Editing a Web page document with Dreamweaver® by activating the application server would result in heavy load, and could not edit a certain portion with a custom tag such as an if tag indicating part of child tags.

SUMMARY OF THE INVENTION

It is an object of the present invention to provide a Web page authoring apparatus, Web page authoring method, and program, which can not only provide a browser-like edit screen without activating a server, but also reflect any style defined outside the body section adequately on the edit screen.

A Web page authoring apparatus according to the present invention comprises:

descriptive content management means for managing descriptive content of documents for a Web page to be edited, the documents being treated as managed target documents;

view object detecting means for detecting, from the description of a managed document, an object to be displayed on a browser screen as a view object, the object being related to the managed document;

direct style detecting means for detecting a direct style based on the description of the managed document, said direct style being a style whose existence is directly described in the managed document among styles to be applied to the view object;

indirect style detecting means for detecting an indirect style from the description of an external document, said indirect style being a style whose existence is not directly described in the managed document and can be found by referring to the external document specified by the description of the managed document;

edit screen data generating means for generating edit screen data based on an association between the view object and the direct and indirect styles to generate an edit screen on which the tag content of the managed document are converted to visual representation;

edit screen generating means for generating the edit screen based on the edit screen data; and synchronization means for synchronizing the content of the managed document with the edited content on the edit screen based on editing operations on the edit screen, wherein the edit screen data generating means matches the edit screen data with the edited content on the edit screen based on the editing operations on the edit screen.

A Web page authoring method according to the present invention comprises:

a descriptive content management step of managing descriptive content of documents for a Web page to be edited, the documents being treated as managed documents;

a view object detecting step of detecting, from the description of a managed document, an object to be displayed on a browser screen as a view object, the object being related to the managed object;

a direct style detecting step of detecting a direct style based on the description of the managed document, said direct style being a style whose existence is directly described in the managed document among styles to be applied to the view object;

an indirect style detecting step of detecting an indirect style from the description of an external document, said indirect style being a style whose existence is not directly described in the managed document and can be found by referring to the external document specified by the description of the managed document;

an edit screen data generating step of generating edit screen data based on an association between the view object and the direct and indirect styles to generate an edit screen on which the tag content of the managed document are converted to visual representation;

an edit screen generating step of generating the edit screen based on the edit screen data; and a synchronization step of synchronizing the content of the managed document with the edited content on the edit screen based on editing operations on the edit screen, wherein the edit screen data generating step matches the edit screen data with the edited content on the edit screen based on the editing operations on the edit screen.

In one aspect, a program according to the present invention causes a computer to function as the respective means of the above-mentioned Web page authoring apparatus. In another aspect, a program according to the present invention causes a computer to execute the respective steps of the above-mentioned Web page authoring method. A program product according to the present invention comprises a computer-readable recording medium and the above-mentioned program recorded on the recording medium.

According to the present invention, not only a direct style but also an indirect style is detected for each view object to be displayed on a browser screen set for a Web page document. Since view objects are displayed on the edit screen with the direct and indirect styles being applied thereto, the author can edit the Web page document while viewing it in the same display state as that of the browser.

BRIEF DESCRIPTION OF THE DRAWINGS

FIG. 13A and FIG. 13B each shows an example of a CSS specification in a Web page document.

FIG. 20 shows a browser-type-edit screen of a conventional Web page authoring tool.

BEST MODE FOR CARRYING OUT THE INVENTION

Figure 1:
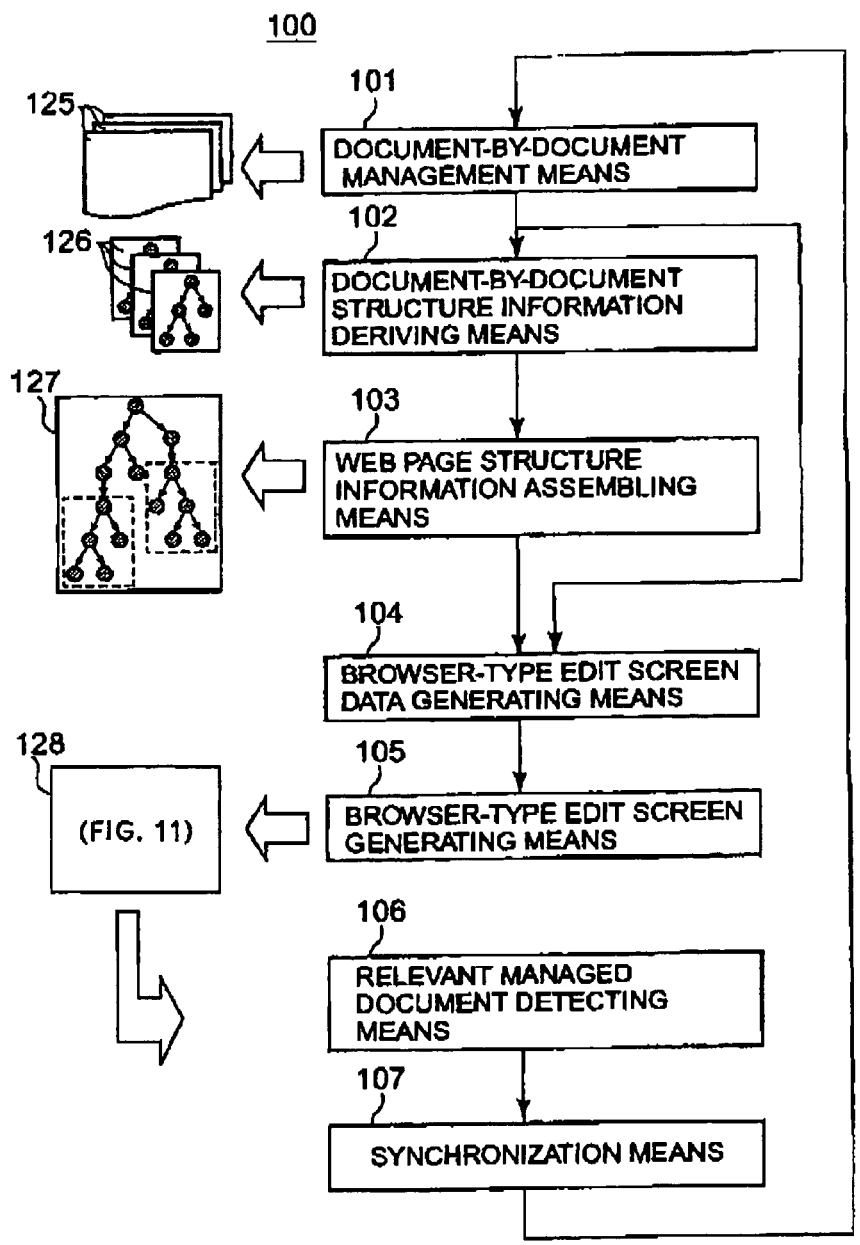
FIG. 1 is a functional block diagram of a first Web page authoring apparatus according to the present invention.

FIG. 1 is a functional block diagram of a Web page authoring apparatus 100. The Web page authoring apparatus 100 includes document-by-document management means 101, document-by-document structure information deriving means 102, Web page structure information assembling means 103, browser-type edit screen data generating means 104, browser-type edit screen generating means 105, relevant managed document detecting means 106, and synchronization means 107. Here, each of documents constituting or creating a Web page is called an associated document of the Web page. The document-by-document management means 101 manages the content of associated documents of the Web page to be edited individually as managed documents 125. A document to be edited specifies another document to be edited based on embed-related code contained in the document to embed that another document to be edited at a predetermined embedding position. The Web page to be edited is made up entirely of two or more managed documents 125 combined according to the embed-related code. The document structure information deriving means 102 derives, as document-by-document structure information 126, structure information of each managed document 125 from the content of each managed document 125. The Web page structure information assembling means 103 assembles, as Web page structure information 127, structure information of a Web page to be edited by combining document-by-document structure information 126 based on the embed-related code in each document-by-document structure information 126.

Here, an edit screen that converts the tag content of documents to be edited into visual representation without showing the tags and hence makes it easy to edit the documents to be edited on the edit screen is called a browser-type edit screen. Although typical documents to be edited are described in a markup language such as HTML or XML, the tags for the markup language, (e.g., < . . . >) are not directly displayed on the browser-type edit screen. The browser-type edit screen data generating means 104 generates browser-type edit screen data for generating a browser-type edit screen 128 based on the content of the managed documents 125 and the Web page structure information 127. The browser-type edit screen generating means 105 generates the browser-type edit screen 128 based on the browser-type edit screen data. The relevant managed document detecting means 106 detects a document including a portion corresponding to an editing portion on the browser-type edit screen 128 as a relevant managed document 125. The synchronization means 107 synchronizes the content of the relevant managed document 125 with the edited content on the browser-type edit screen 128 based on the editing operations on the browser-type edit screen 128. The browser-type edit screen data generating means 104 matches the browser-type edit screen data with the edited content on the browser-type edit screen 128 based on the editing operations on the browser-type edit screen 128.

Figure 3:
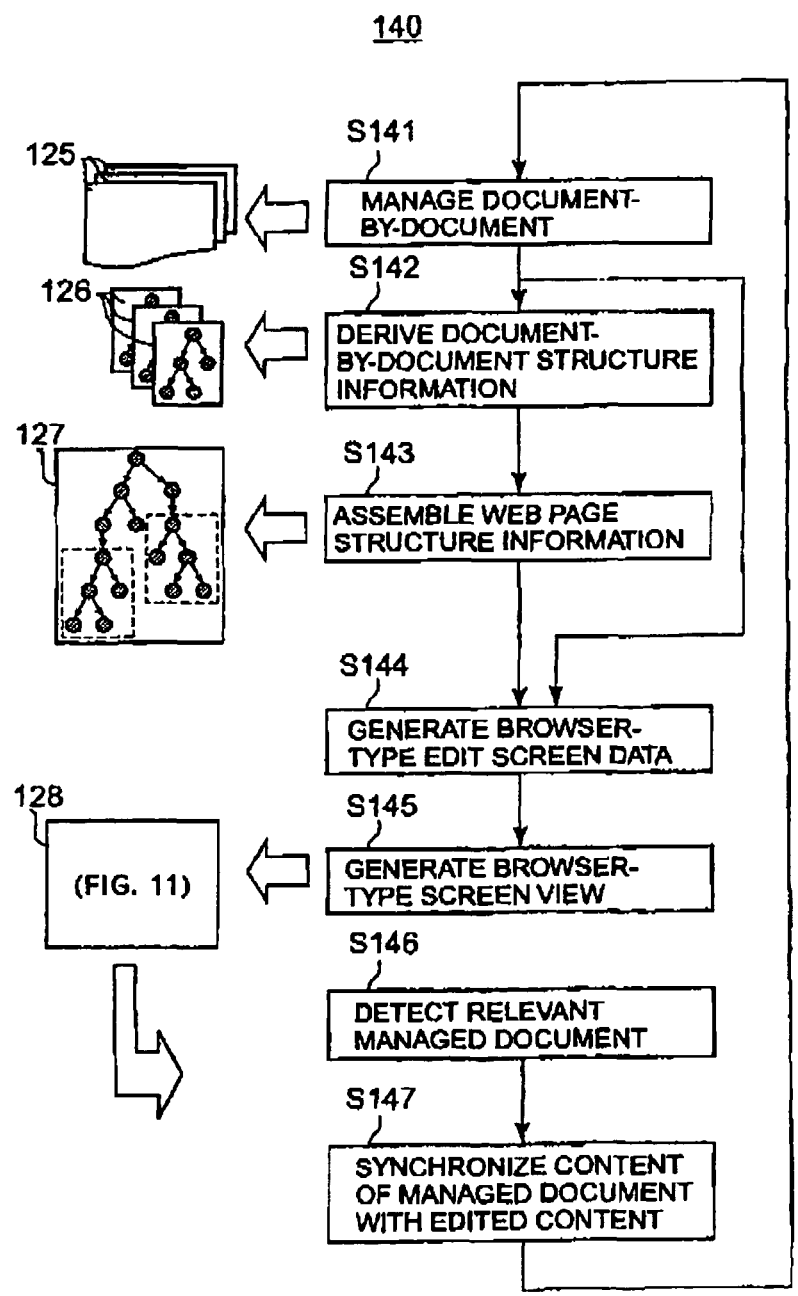
FIG. 3 is a flowchart of a first Web page authoring method according to the present invention.

FIG. 3 is a flowchart of a Web page authoring method 140. In document-by-document management step S141, documents associated with a Web page to be edited are managed as managed documents 125 individually. In document-by-document structure information deriving step S142, structure information of each managed document 125 is derived as document-by-document structure information 126 from the content of the managed document 125. In Web page structure information assembling step S143, structure information of a Web page to be edited is assembled as Web page structure information by combining document-by-document structure information 126 based on embed-related code in each document-by-document structure information 126. In browser-type edit screen data generating step S144, browser-type edit screen data for generating a browser-type edit screen 128 is generated based on the content of the managed documents 125 and the Web page structure information. In browser-type edit screen generating step S145, the browser-type edit screen 128 is generated based on the browser-type edit screen data. In step S146 for detecting a relevant managed document 125, a managed document including a portion corresponding to an editing portion on the browser-type edit screen 128 is detected as a relevant managed document 125. In synchronizing step S147, the content of the relevant managed document 125 is synchronized with the edited content on the browser-type edit screen 128 based on the editing operations on the browser-type edit screen 128. Then, in browser-type edit screen data creating step S144, the browser-type edit screen data is matched with the edited content on the browser-type edit screen 128 based on the editing operations on the browser-type edit screen 128.

Since the Web page authoring apparatus 100 of FIG. 1 and the Web page authoring method 140 of FIG. 3 have the same technical effect, except that one is implemented as an apparatus invention and the other a method invention, that is, they are different only in invention category, the following collectively describes both.

For example, a Web page is a structured document, while each associated document of the Web page is either a structured document or a document for generating a structured document. To be more specific, a Web page to be edited is, for example, an HTML document, while a managed document 125 is, for example, a JSP, HTML, or XML document. Assuming that there are two documents in an embedding relationship in which embed-related code is in one document to embed the other document, the one is called a parent document and the other is called a child document. Unlike those supporting the editing of only the parent document, the Web page authoring apparatus 100 supports the editing of both the parent document and the child document.

In typical Web systems, Web pages are HTML documents. When a Web page consists of two or more documents to be edited, which are associated documents of the Web page, a parent document at the top level among these documents to be edited is, for example, a JSP document. The child document is a JSP, HTML, or XML document. In JSP documents, Java™ code is embedded in HTML in an appropriate manner. Therefore, if the child document is a JSP document, other documents can be embedded in the child document using embed-related code. Thus, any two managed documents extracted from documents associated with a common Web page to be edited may be in a direct parent-child relationship, or in such a relationship that they are located at both ends of a chain of parent-child relationships (that is, in a relationship between ancestor and descendant more than two generations apart).

There are the following cases: (a) a child document may be embedded in two or more places in a parent document; or (b) since the Web page authoring apparatus 100 and the Web page authoring method 140 enable the editing of two or more Web pages by switching over among them, a document as a child document may be embedded in parent documents for different Web pages. In the Web page authoring apparatus 100 and the Web page authoring method 140, the document-by-document management means 101 manages a child document in an integrated fashion as one managed document 125. Therefore, if the child document in the case (a) is edited in one of the embedding places in one parent document, the same editing operation in the other places can be omitted. On the other hand, if the child document in the case (b) is edited on the browser-type edit screen 128 related to one parent document, the editing of the child document in the other parent documents can be omitted.

Figure 9:
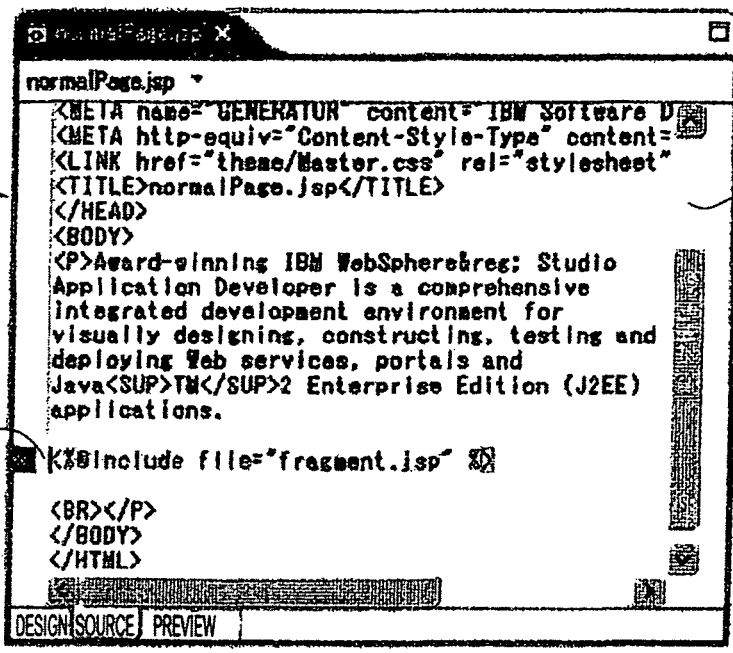
FIG. 9 shows a display state of a parent document and a child document on a source screen of a Web page authoring tool.
Figure 10:
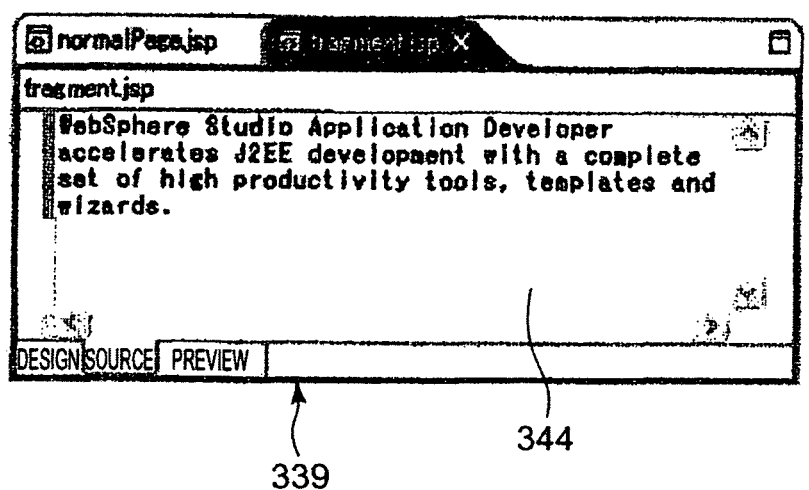
FIG. 10 shows a display state of the child document on the source screen of the Web page authoring tool.

FIGS. 9 and 10 show the display states of a parent document 340 and a child document 344 on a source screen 339 of a Web page authoring tool 338, respectively. The Web page authoring tool 338 is an example of the Web page authoring apparatus 100. The parent document 340 and the child document 344 are examples of predetermined documents associated with Web page to be edited. The Web page authoring tool 338 can display the documents to be edited on the source screen 339, a design screen 347 (FIG. 11), and a preview screen. The design screen 347 is an example of the browser-type edit screen 128.

The source screen 339 displays source code of a document to be edited, showing the parent document 340 with not only its tag content but also a tag indicating that the child document 344 is embedded. Both the parent document 340 and the child document 344 are JSP documents, and the name of the parent document 340 is normalpage.jsp. The name of the child document 344 is fragment.jsp as apparent from the following embed-related code 341: <%@include file="fragment.jsp"%>. In this specification, a document may be any file excluding executable ones. Although the embed-related code 341 states that the child document 344 is embedded at a node position indicated by the embed-related code 341, it should be noted that the present invention is applicable to such a case that the embed-related code may be rewritten in future to specify a different node other than the embedding node position.

The Web page authoring tool 338 starts a browser on the preview screen so that the browser will render the actual state of the document to be edited. The preview screen of the Web page authoring tool 338 is the same as that of the browser. An individual document is displayed on the source screen 339, while a Web page to be edited generated by combining documents based on the embed-related code is displayed on the design and preview screens.

The source screen 339 in FIG. 9 shows only the final paragraph of the parent document 340 due to limitations of screen space without showing the beginning part of the parent document 340 on the source screen 339. The author can drag the scroll box to any position in the scroll bar on the right hand to edit any part of the parent document 340. The embed-related code 341 is placed in BODY section between start tag <body> and end tag </body> in the parent document 340.

Figure 11:
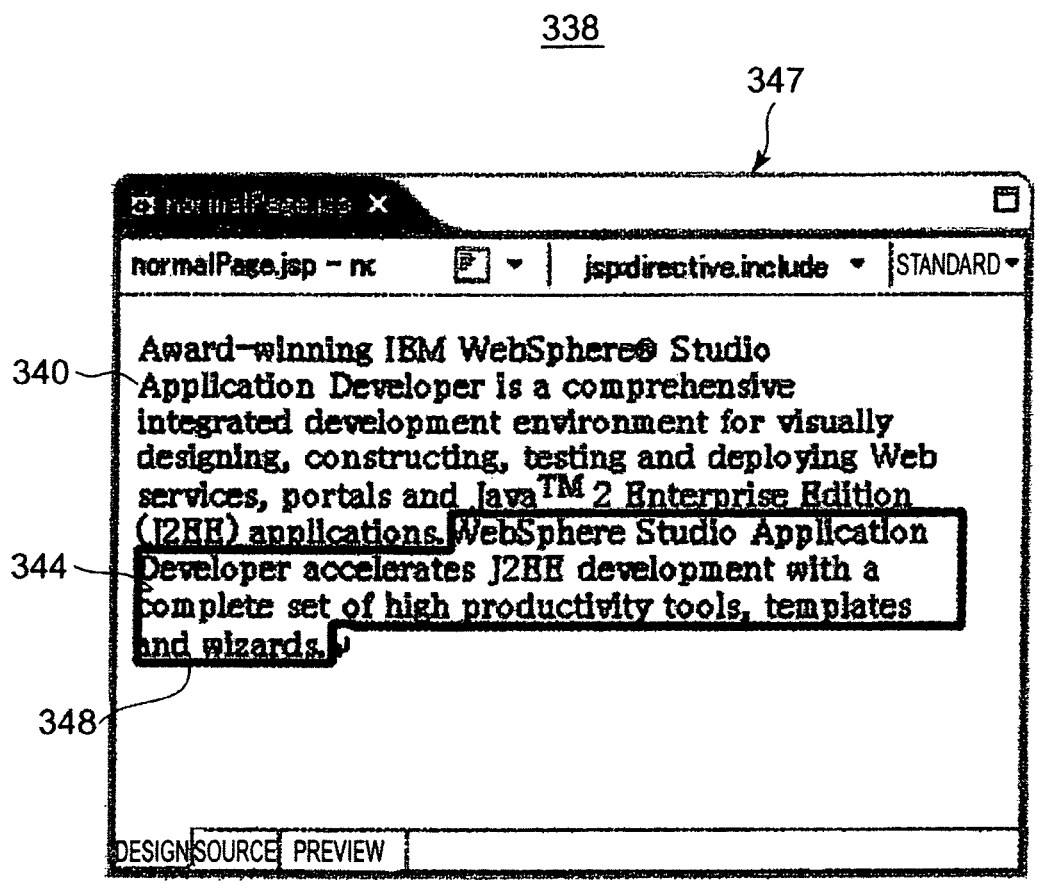
FIG. 11 shows a display state of the parent document on a design screen of the Web page authoring tool.

FIG. 11 shows the display state of the parent document 340 on the design screen 347 of the Web page authoring tool 338. The design screen 347 is an example of the browser-type edit screen 128 (FIGS. 1 and 3). An embedding box 348 is just added to FIG. 7 to clearly illustrate the position of embedding the child document 344 on the design screen 347, but it does not appear on an actual design screen 347. However, the embedding box 348 may be actually displayed with a predetermined operation to let the author know where the child document 344 is located at the time of editing. The Web page authoring tool 338 shows a Web page to be edited as if it looks visually the same in both the design screen 347 and the preview screen. A different point is that when clicking on a link-embedded text or image on the preview screen, view is switched to a linked Web page, whereas such a thing never happens on the design screen 347. The author can directly edit the source code of the parent document 340 and the child document 344 on the source screen 339 (FIGS. 9 and 10) while the author can edit the parent document 340 and the child document 344 on the design screen 347 in the same display state as that of the browser screen for the documents to be edited in which the parent document 340 and the child document 344 are associated documents, even if the author is not familiar with specific HTML tags or JSP commands.

Figure 12:
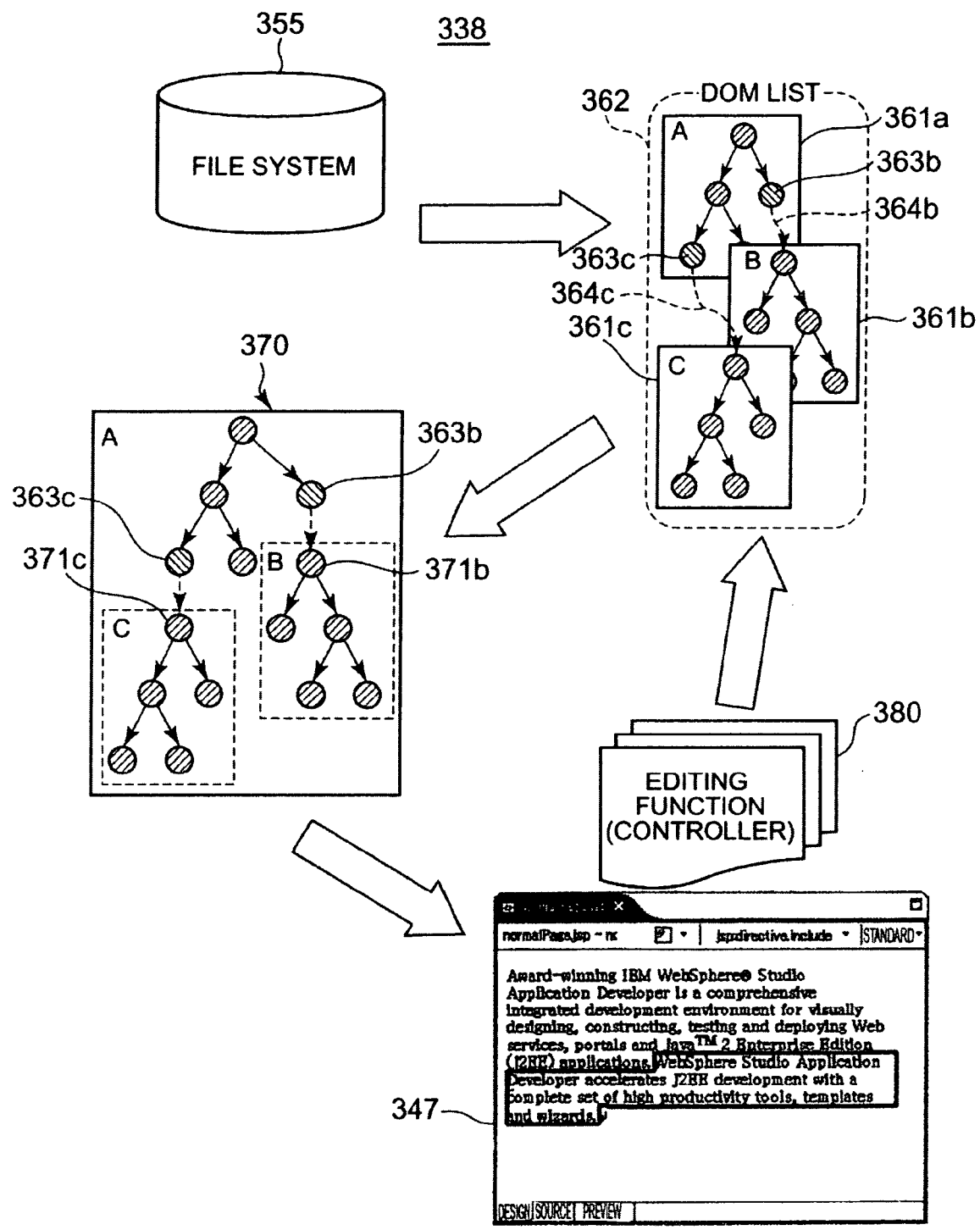
FIG. 12 is an illustration for explaining processing functions of the Web page authoring tool.

FIG. 12 is an illustration for explaining processing functions of the Web page authoring tool 338. It is assumed in FIG. 8 that the Web page to be edited is represented as Web page W (though W is not shown, W is used to indicate a specific Web page for convenience of explanation), and documents A, B, and C are documents associated with the Web page W. It is further assumed that the document A is a parent document, and the documents B and C are child documents embedded in different places in the document A. Here, suppose that the documents A, B, and C are already stored in a file system 355. In other words, this editing session is to reedit the Web page W. The file system 355 is an example of an auxiliary memory 116, typified by a local drive of a personal computer on which the Web page authoring tool 338 is installed. When the author specifies the document A or the Web page W, the Web page authoring tool 338 loads the document A from the file system 355. The Web page authoring tool 338 searches the loaded document A for embed-related code, and if any embed-related code is found, the documents B and C are loaded from the file system 355 as documents to be embedded in the document A. If either or both of the documents B and C further have child documents, they will be processed in the same manner as the document A. Searching the document A for embed-related code may be done in connection with the creation of DOM information 361a on the document A.

The Web page authoring tool 338 creates DOM (Document Object Model) information 361a, 361b and 361c on each document loaded, and manages such DOM information in a DOM list 362. The DOM itself is well-known XML structure information. The DOM list 362 also manages embed-related nodes 363b and 363c associated with the embed-related code in the parent document and link information 364b and 364c to the child documents embedded in the parent document by the embed-related code. The management of the content of each of the documents A, B, and C in the DOM list 362 corresponds to the management of managed documents by the document-by-document management means 101 of the Web page authoring apparatus 100 and in step S141 of the Web page authoring method 140. The derivation of the DOM information 361a, 361b, and 361c corresponds to the derivation of the document-by-document structure information 126 by the document structure information deriving means 102 of the Web page authoring apparatus 100, and in step S142 of the Web page authoring method 140. The embed-related nodes 363b and 363c, and the link information 364b and 364c are examples of information as the basis of processing for assembling the Web page structure information 127 by the Web page structure information assembling means 103 of the Web page authoring apparatus 100 and in step S143 of the Web page authoring method 140.

A view object tree 370 corresponds to the DOM information of the entire Web page W, and is created based on the DOM information 361a, 361b and 361c, the embed-related nodes 363, and the link information 364. In the view object tree 370, the embed-related nodes 363b and 363c of the document A as the parent document are managed integrally with the root nodes 371b and 371c of the documents B and C as the child documents linked to the parent document, respectively. The view object tree 370 is an example of the Web page structure information 127.

Since each node in the view object tree 370 also contains the content of the document A, B, or C, the edit screen data from which the design screen 347 is generated is generated based on the view object tree 370. The design screen 347 is generated based on the edit screen data. The design screen 347 in FIG. 12 has the same content as the design screen 347 in FIG. 11. However, an actual display of the design screen 347 of FIG. 12 shows view objects, such as text and images, defined in each of the documents A, B, and C to be displayed on the Web page, in virtually the same visual representation as on a browser screen, that is, in a visual representation mode of the browser-type edit screen.

The author edits the Web page W on the design screen 347. The editing on the design screen 347 includes the editing of text and style (layout, font, font size, etc), and editing related to embedding of other documents. The edited content may also include images as well as text. The Web page authoring tool 338 having sufficient editing functions allows the author to edit image content itself on the design screen 347 as well as to do some simple editing of an image such as to insert or delete the image. In addition, the author can do editing work on the design screen 347 without consideration about to which of the documents A, B, and C the portion being edited belongs.

An editing function part 380 monitors the editing done by the author on the design screen 347. Processing in the editing function part 380 corresponds to specific procedures in the managed document detecting means 106 and the synchronization means 107 of the Web page authoring apparatus 100, and in steps S146 and S147 of the Web page authoring method 140. Based on the monitoring results, the editing function part 380 detects which of the documents A, B, and C includes the portion corresponding to the portion edited on the design screen 347. Then, once the content is updated on the design screen 347, the updated content is reflected in the content of the corresponding document A, B, or C. When editing corresponding to the addition or deletion of a node is done on the design screen 347, the addition or deletion of the node is performed on the DOM information 361a, 361b, or 361c. When an embedding position is changed on the design screen 347, a corresponding embed-related node 363b or 363c, and corresponding link information 364b or 364c, etc. in the DOM list 362 are changed in synchronization with the change on the design screen 347. When editing corresponding to the embedding of a new child document or deletion of an existing child document is done on the design screen 347, the addition of new DOM information to the DOM list 362 or the deletion of corresponding link information from the DOM list 362 is performed in synchronization with the editing operation on the design screen 347.

The view object tree 370 is updated as the DOM information 361a, 361b, or 361c is updated in the DOM list 362. Thus the consistency between the content of the design screen 347 and that of the view object tree 370 is maintained. To be more specific, this matching process includes the following steps. In the first step (a), the author does editing work on the design screen 347. In step (a), the edited content is not reflected on the design screen 347 yet. In the next step (b), corresponding DOM information 361a, 361b, or 361c is updated. As a result, a difference occurs between the content of the DOM information 361a, 361b, or 361c and the content of the design screen 347. In step (c), the view object tree 370 is updated based on the updated content of the DOM information 361a, 361b, or 361c. Steps (a) to (c) are completed instantaneously, so that the author will feel like the design screen 347 is reflecting the content the author has just input or edited.

As stated above, when the plural documents A, B, and C in a parent-child relationship are associated documents for one Web page W, the Web page authoring tool 338 generates a design screen 347 in virtually the same representation mode as that of a browser showing the Web page W, so that the author can edit the documents A, B, and C collectively on the design screen 347.

Returning to FIGS. 1 and 3, additional functions and additional processing of the Web page authoring apparatus 100 and the Web page authoring method 140 will be described below.

In order to match the browser-type edit screen data with the content edited on the browser-type edit screen, the browser-type edit screen data generating means 104 of the Web page authoring apparatus 100 synchronizes the content of the managed document 125 with that of the Web page structure information 127 to update the browser-type edit screen data. Similarly, in order to match the browser-type edit screen data with the content edited on the browser-type edit screen, the browser-type edit screen data is updated in step S144 of the Web page authoring method 140 based on the synchronization between the content of the managed document 125 and that of the Web page structure information 127.

The following describes a typical example of the process to reflect the edited content on the browser-type edit screen:

(a) The content of editing done by the author on the browser-type edit screen 128 is reflected on the content of a relevant managed document 125. At this moment, the browser-type edit screen 128 is not changed yet.

(b) The Web page structure information 127 is updated based on the updated content of the managed document 125.

(c) The browser-type edit screen data is updated to update the browser-type edit screen 128.

Figure 2:
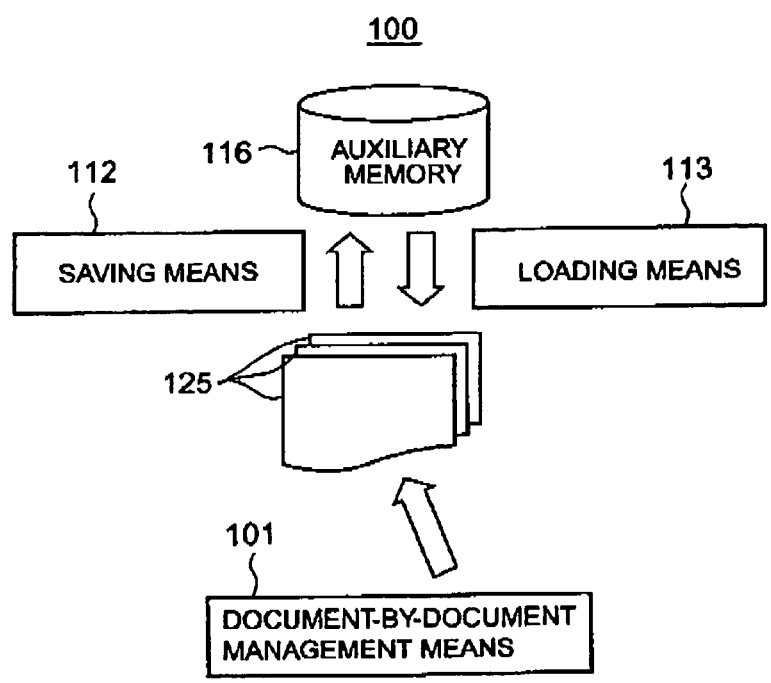
FIG. 2 is a functional block diagram of the main part of the first Web page authoring apparatus with additional functions.
Figure 4:
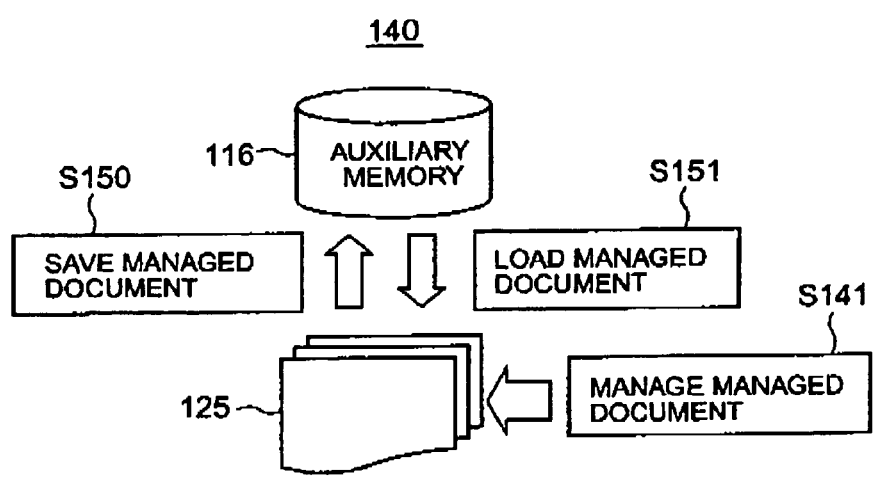
FIG. 4 is a flowchart of the main part of the first Web page authoring method with additional processing steps.

FIG. 2 is a functional block diagram of the main part of the Web page authoring apparatus 100, showing additional functions. FIG. 4 is a flowchart of the main part of the Web page authoring method 140, showing additional processing steps. When saving a Web page to be edited into an auxiliary memory 116, saving means 112 of the Web page authoring apparatus 100 saves at least a managed document 125 associated with the Web page to be edited, the content of which is updated (typically all the managed documents 125). When loading a Web page to be edited from the auxiliary memory 116 prior to start of editing, loading means 113 loads all the associated documents of the Web page to be edited. The document-by-document management means 101 manages the content of the loaded associated documents individually as managed documents 125. Similarly, when a Web page to be edited is saved into the auxiliary memory 116, at least a managed document 125 associated with the Web page to be edited, the content of which is updated (typically all the managed documents 125) is saved in saving step S150 of the Web page authoring method 140. On the other hand, when a Web page to be edited is loaded from the auxiliary memory 116 prior to start of editing, all the documents associated with the Web page to be edited are loaded in loading step S151. Then, in step S141, the content of the loaded associated documents are managed individually as managed documents 125. As stated above, the Web page associated documents edited on the browser-type edit screen 128 are saved in the auxiliary memory 116, and upon reediting, they are loaded from the auxiliary memory 116 into the Web page authoring apparatus 100. The saving and loading operations are thus performed without difficulty.

Here, a hierarchical relation between documents is so defined that the level of a document to embed another document is at one level higher than that of another document. Among the managed documents 125 associated with the Web page to be edited, the one at the top of the hierarchy is called a top-level managed document 125. The loading means 113 of the Web page authoring apparatus 100 first loads the top-level managed document 125 among the associated managed documents 125 of the Web page to be reedited. Then, when the loaded managed document 125 is to embed a managed document 125 lower than the loaded managed document 125 by one level, the loading means 113 loads the lower managed document 125 from the auxiliary memory 116. Similarly, in step S151 of the Web page authoring method 140, the top-level managed document 125 is first loaded among the associated managed documents 125 of the Web page to be reedited. Then, when the loaded managed document 125 is to embed a managed document 125 lower than the loaded managed document 125 by one level, the lower managed document 125 is loaded in step S151 from the auxiliary memory 116. As stated above, when a Web page to be edited already stored in the auxiliary memory 116 is to be reedited, associated documents can be loaded from the auxiliary memory 116 without difficulty.

In FIG. 1, when such an edit operation as to add a new document to be edited is performed on the browser-type edit screen 128, the synchronization means 107 synchronizes the addition of a managed document 125 corresponding to the document to be edited with the document addition on the browser-type edit screen 128, thus adding the managed document 125. Similarly, in FIG. 3, when such an edit operation as to add a new document to be edited is performed on the browser-type edit screen 128, the addition of a managed document 125 corresponding to the document to be edited is synchronized in step S147 with the document addition on the browser-type edit screen 128, thus adding the managed document 125. When a new Web page to be edited is created, a new parent document needs to be added, while when a new child document to be embedded in the parent document is created, the new child document needs to be added. A new managed document 125 is added each time a document is added to the browser-type edit screen 128. This allows for the addition of a new document to be edited through the edit operation on the browser-type edit screen 128.

Further, when such an edit operation as to delete a document to be edited is performed on the browser-type edit screen 128, the synchronization means 107 synchronizes the deletion of a managed document 125 corresponding to the document to be edited with the deletion of the document to be edited on the browser-type edit screen 128, thus deleting the managed document 125. Similarly, in step S147, when such an edit operation as to delete a document to be edited is performed on the browser-type edit screen 128, the deletion of a managed document 125 corresponding to the document to be edited is synchronized with the deletion of the document to be edited on the browser-type edit screen 128, thus deleting the managed document 125. This allows for the deletion of a document to be edited through the edit operation on the browser-type edit screen 128.

Note that such an edit operation as to cancel the embedding of a document to be edited as a child document may also be performed on the browser-type edit screen 128. Under such circumstances, it should be considered two different cases: (a) when there are two or more embedding positions for the child document, and (b) when there is only one embedding position for the child document. In case (a), the Web page authoring apparatus 100 and the Web page authoring method 140 typically synchronizes the cancellation of embedding of a relevant managed document 125 with the cancellation of embedding of the document to be edited on the browser-type edit screen 128 to delete only the link information 364*b* or 364*c* (FIG. 12). In case (b), the synchronization means 107 synchronizes the deletion of the relevant managed document 125 with the cancellation of embedding of the document to be edited on the browser-type edit screen 128 to delete the managed document 125.

The document structure information 126 is tree structure information, while the Web page structure information 127 is tree structure information connecting all pieces of tree structure information on the managed documents 125 in such a management relationship that a node associated with embed-related code in tree structure information on a certain managed document 125 is attached to the root of another managed document 125 to be embedded in the certain managed document 125 according to the embed-related code. The DOM information 361*a*, 361*b*, 361*c* is an example of the document structure information 126 as the tree structure information, while the view object tree 370 is an example of the Web page structure information 127 as the tree structure information.

Figure 5:
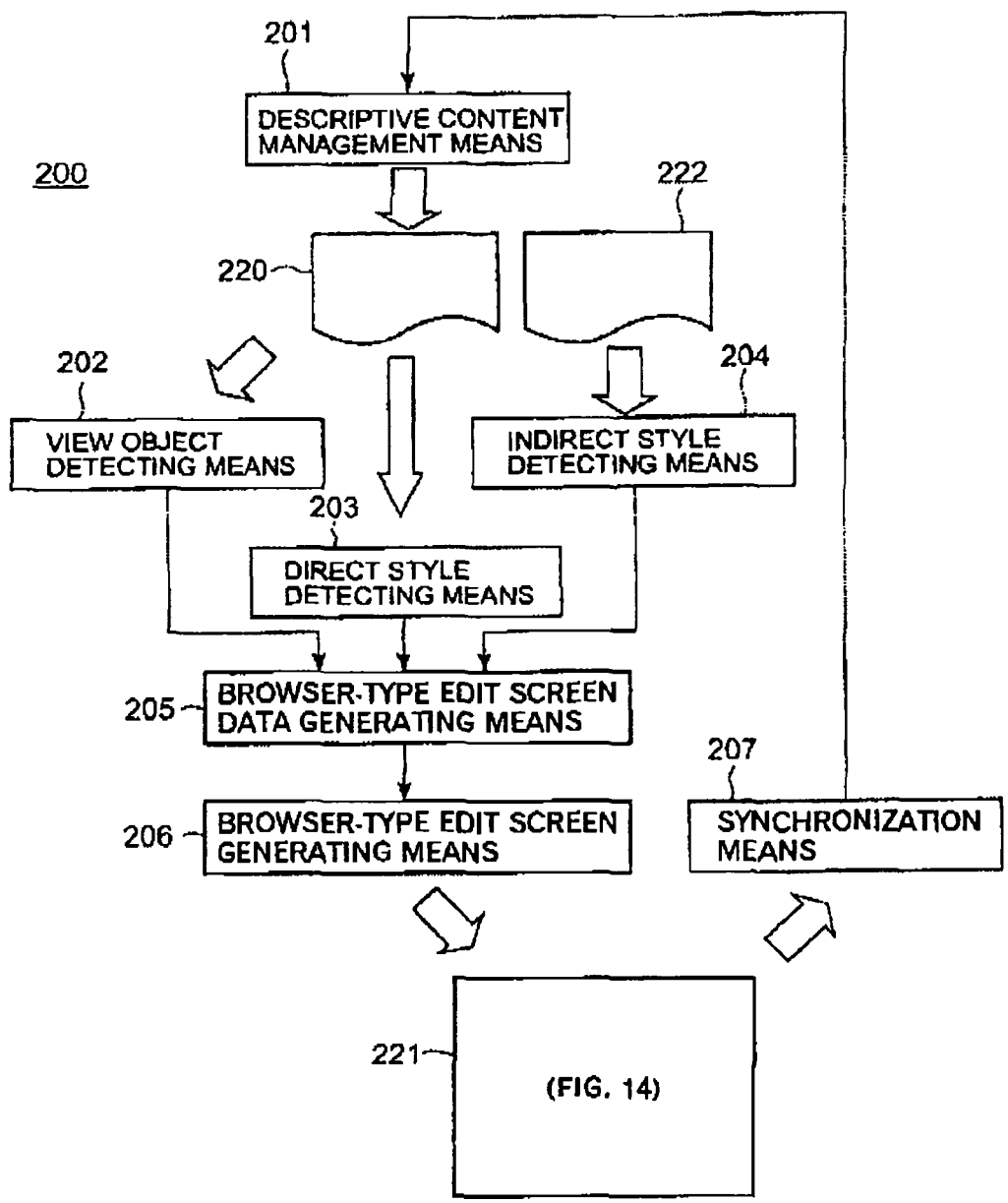
FIG. 5 is a functional block diagram of a second Web page authoring apparatus according to the present invention.

FIG. 5 is a functional block diagram of a Web page authoring apparatus 200. The Web page authoring apparatus 200 includes descriptive content management means 201, view object detecting means 202, direct style detecting means 203, indirect style detecting means 204, browser-type edit screen data generating means 205, browser-type edit screen generating means 206, and synchronization means 207. The descriptive content management means 201 manages the descriptive content of a document for a Web page to be edited as a managed document 220. The view object detecting means 202 detects, from the description of the managed document 220, an object related to the managed document 220 as a view object to be displayed on a browser screen. Among styles applied to the view object, a style whose existence is directly described in the managed document 220 is called a direct style. The direct style detecting means 203 detects a direct style based on the description of the managed document 220. Further, among styles applied to the view object, a style whose existence is not directly described in the managed document 220 and is known only after referring to an external document specified in the description of the managed document 220 is called an indirect style. The indirect style detecting means 204 detects an indirect style from the description of the external document 222.

Here, an edit screen that converts the tag content of the managed document 220 into visual representation without showing the tags and hence makes it easy to edit the managed document 220 on the edit screen is called a browser-type edit screen 221. The browser-type edit screen data generating means 205 generates browser-type edit screen data for generating a browser-type edit screen 221 to display the managed document 220 based on the association between the view object and direct and indirect styles. The browser-type edit screen generating means 206 generates the browser-type edit screen 221 based on the browser-type edit screen data. The synchronization means 207 synchronizes the content of the managed document 220 with the edited content on the browser-type edit screen 221 based on the editing operations on the browser-type edit screen 221. The browser-type edit screen data generating means 205 matches the browser-type edit screen data with the edited content on the browser-type edit screen 221 based on the editing operations in the browser-type edit screen 221.

Figure 7:
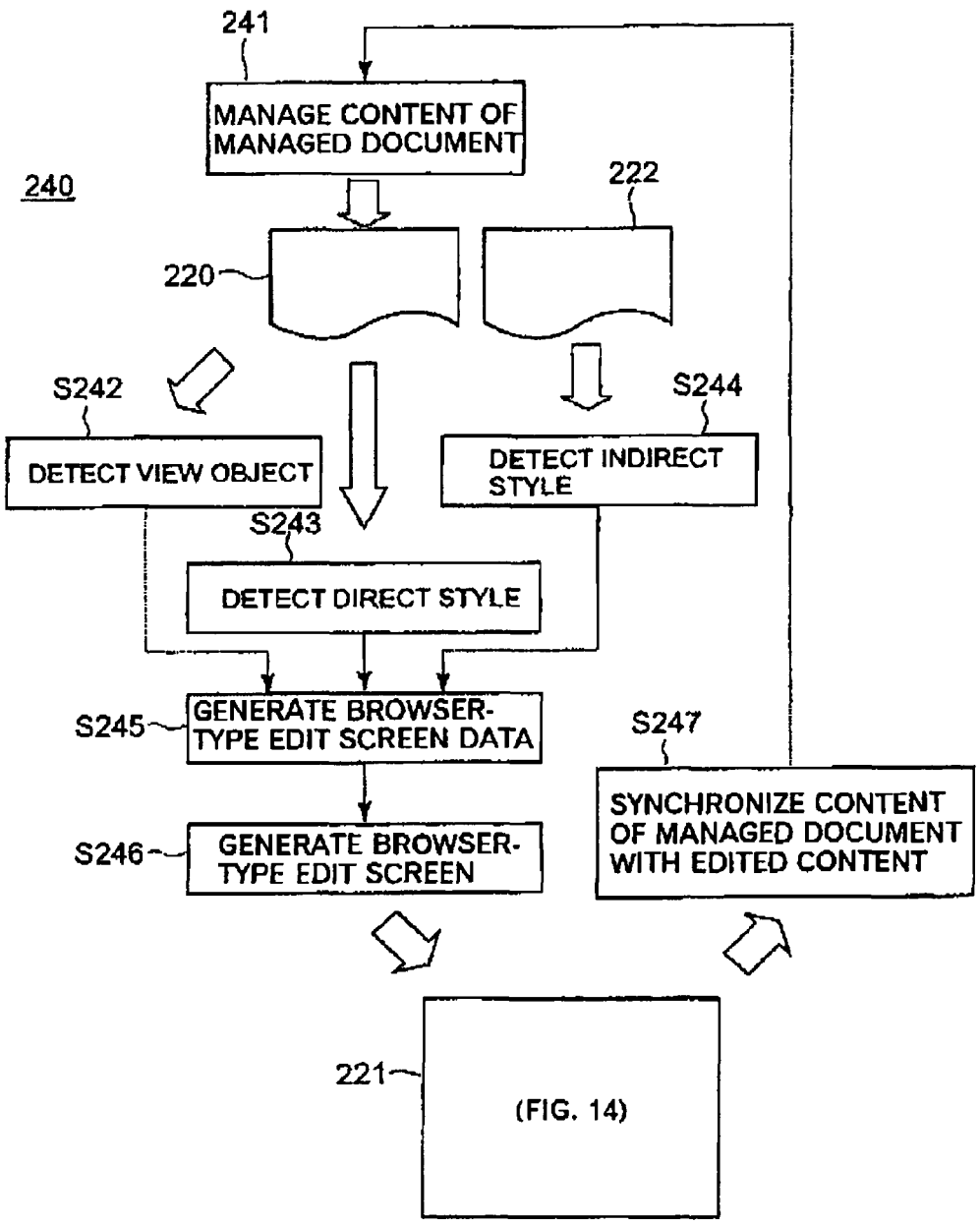
FIG. 7 is a flowchart of a second Web page authoring method according to the present invention.

FIG. 7 is a flowchart of a Web page authoring method 240. In descriptive content management step S241, the descriptive content of a document for a Web page to be edited is managed as a managed document 220. In view object detecting step S242, an object related to the managed document 220 to be displayed on a browser screen is detected as a view object from the description of the managed document 220. In direct style detecting step S243, a direct style is detected from the description of the managed document 220. In indirect style detecting step S244, an indirect style is detected from the description of an external document. In browser-type edit screen data generating step S245, browser-type edit screen data for generating a browser-type edit screen to display the managed document 220 is generated based on the association between the view object and the direct and indirect styles. In browser-type edit screen generating step S246, the browser-type edit screen is generated based on the browser-type edit screen data. In synchronization step S247, the content of the managed document 220 is synchronized with the edited content on the browser-type edit screen based on the editing operations on the browser-type edit screen. Then, in browser-type edit screen data generating step S245, the browser-type edit screen data is matched with the edited content on the browser-type edit screen based on the editing operations on the browser-type edit screen.

Since the Web page authoring apparatus 200 of FIG. 5 and the Web page authoring method 240 of FIG. 7 have the same technical effect, except that they are implemented as a apparatus invention and a method invention, respectively, different only in invention category, the following collectively describes both.

A document for a Web page to be edited used in the Web page authoring apparatus 200 and the Web page authoring method 240 is a structured document. To be more specific, it is an HTML or JSP document. An HTML document has a document information description section, that is, a head (HEAD) section, and a display content description section, that is, a body (BODY) section.

FIG. 13A and FIG. 13B each shows an example of a CSS (Cascading Style Sheet) specification in a Web page document. FIG. 13A shows an example of how to describe a direct style in a Web page document 401. In this example, an external document, "mystyle.css," is determined as a style sheet directly from the description: rel="stylesheet". The direct style includes, for example, a style described as an attribute value (such as a color attribute value) in the head (tag name) section. For example, a color attribute value, #FF0000, means red. FIG. 13B shows an example of how to describe an indirect style. In this example, it cannot be determined from the description of a JSP document 404 whether the external document, "mystyle.css," specifies the style of a view object of the JSP document 404. In this case, only after referring to the content of an external document 405 as the output result of a custom tag <my:link>, it can be identified from rel="stylesheet" that "mystyle.css" is a style sheet.

Figure 14:
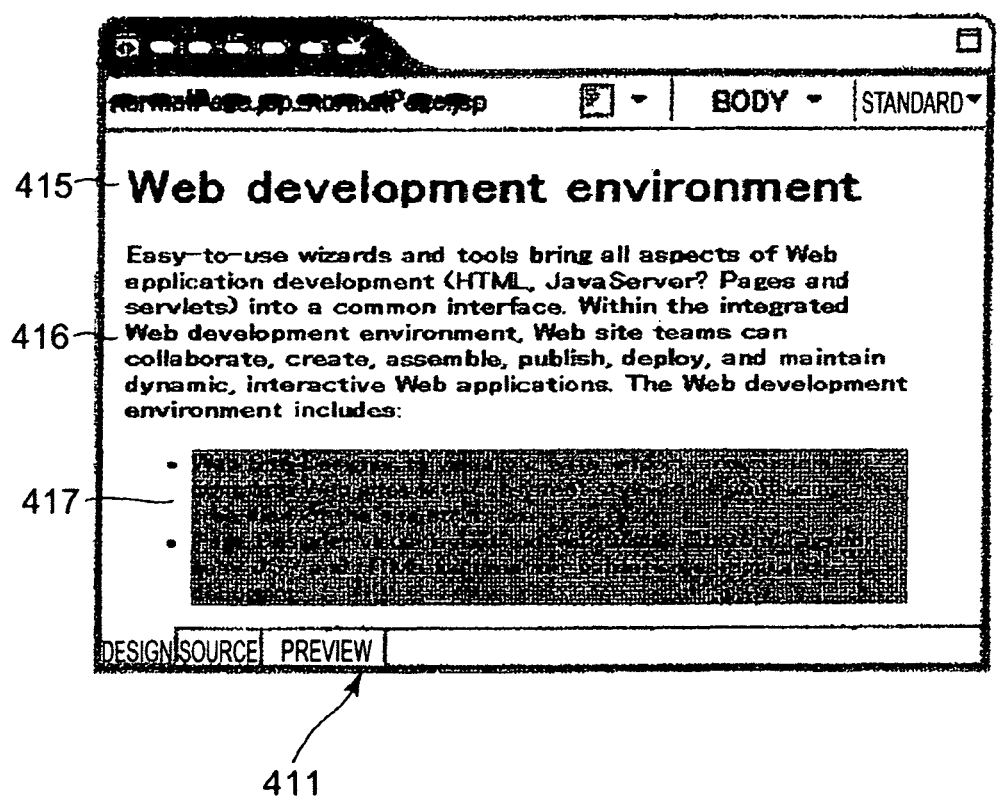
FIG. 14 shows a display example of a browser-type edit screen of another Web page authoring tool.

FIG. 14 shows a display example of a browser-type edit screen 411 of a Web page authoring tool 410. The Web page authoring tool 410 is an example of the Web page authoring apparatus 200, and the browser-type edit screen 411 is an example of the browser-type edit screen 221. For paragraph types, paragraphs 415, 416, and 417 are set as, for example, heading, normal, and bullet list, respectively. The Web page to be edited displayed on the browser-type edit screen 411 uses CSS as an external file for a style of each paragraph. In the CSS, the text color of the paragraph 415 is set to blue, the text color of the paragraph 416 to green, and the background color of the paragraph 417 to red. Although the black-and-white display in FIG. 14 makes it hard to distinguish differences in color, such a color is applied to each paragraph in the actual browser-type edit screen 411.

Figure 15:
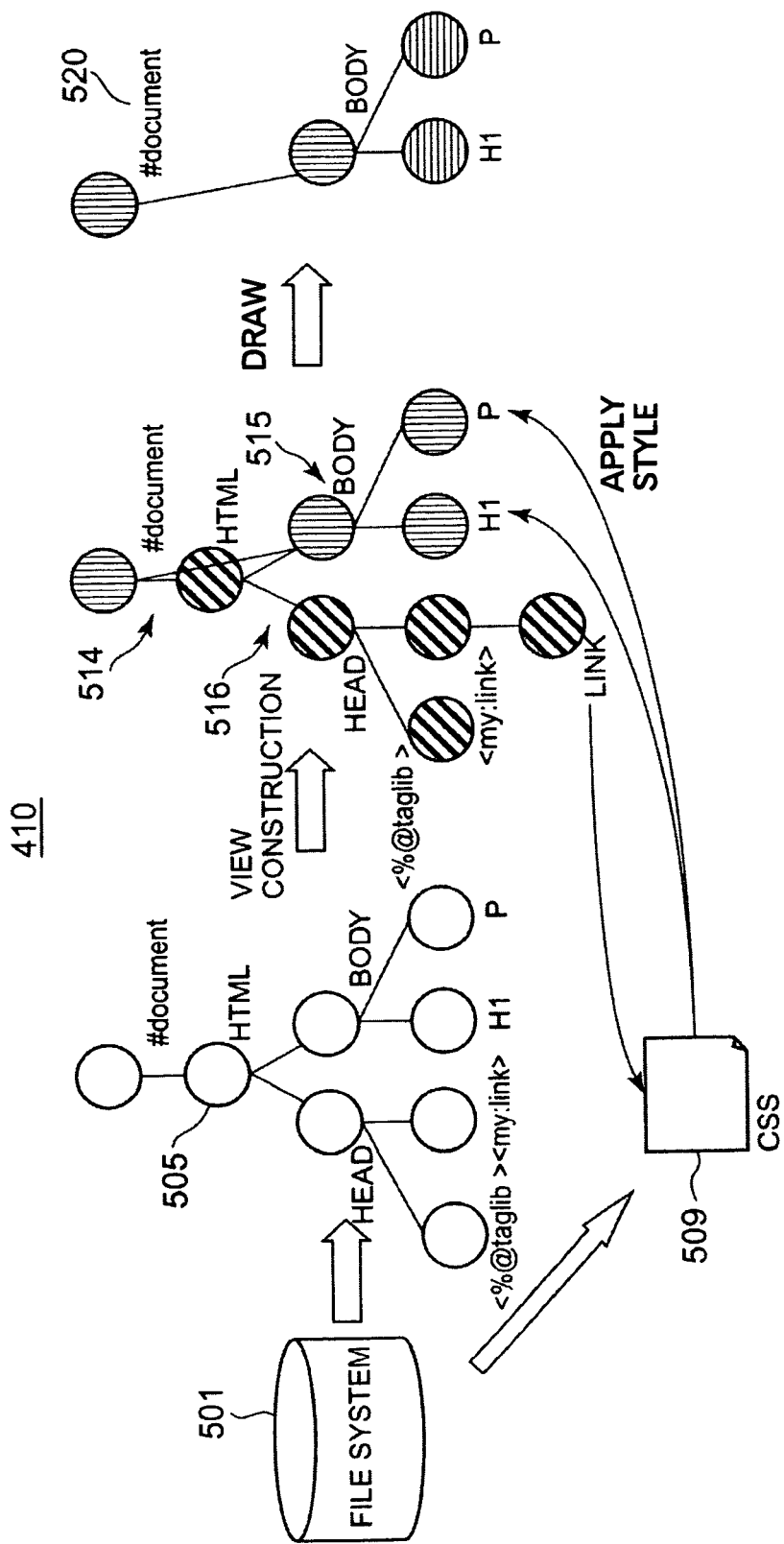
FIG. 15 is an illustration for explaining processing functions of the Web page authoring tool.

FIG. 15 is an illustration for explaining processing functions of the Web page authoring tool 410. For convenience of explanation, the following illustrates a document for a Web page to be edited, which is named document V (not shown). When the document V is to be reedited, the document V is loaded from a file system 501. The file system 501 is an example of the auxiliary memory 224, typified by a local drive of a personal computer on which the Web page authoring tool 410 is installed. The descriptive content of the document V is as follows:

```
<HTML>
    <HEAD>
        <%@taglib uri="sample.tld" prefix="my" />
        <my:link href="mystyle.css" />
    </HEAD>
    <BODY>
        <H1>Sample</H1>
        <P>
            . . .
        </P>
    </BODY>
</HTML>
```

Next, DOM information 505 is derived from the document V loaded. The DOM information 505 is an example of modeling the managed document 220 (FIG. 5). In the DOM information 505, the root node is a document (#document) and an HTML document follows as a child document. The HTML node has two nodes, HEAD and BODY, as child nodes. The JSP directive node <%@taglib>, and the custom tag <my:link> generating style information are child nodes of the HEAD node. The Web page authoring tool 410 loads a corresponding CSS from the file system 501 based on the description of the CSS specification node. In the DOM information 505, the BODY node is followed by paragraph nodes H1 and P. When the document V is to be newly created, nodes ranging from #document to HEAD and BODY are created in the DOM information 505, and then various nodes are added after the HEAD and BODY nodes according to the editing operations. The custom tag <my:link> generates a LINK tag by a VCT (Visual Custom Tag: this is a mechanism for providing, at the time of editing, a display similar to that in a browser to which HTML converted from a JSP document processed on an application server is sent from the application server. This allows the Web page authoring tool 410 to capture, as an external document, the results similar to the output results from the application server using the custom tag) or the like. The LINK tag has a CSS document (file), which the Web page authoring tool 410 loads from the file system 501. For convenience of explanation, the loaded CSS file is called a CSS model 509.

Then, a view object tree 514 is created based on the DOM information 505 and the CSS model 509. The view object tree 514 is divided into two parts, one is a displayed view object group 515 and the other is a non-displayed view object group 516. The displayed view object group 515 includes nodes related to the above-mentioned view objects and the tags specifying the styles (direct styles) of the view objects. To be specific, they belong to the BODY (tag name). The nodes belonging to the displayed view object group 515 are shown with a vertical-striped pattern in the drawing for clarification. The non-displayed view object group 516 includes nodes related to styles (<LINK href . . . > in FIG. 13A corresponds to a node related to a direct style, while <my:link href . . . > in FIG. 13B corresponds to a node related to an indirect style). To be specific, they belong to the HEAD (tag name). The nodes belonging to the non-displayed view object group 516 are shown with an oblique-striped pattern in the drawing for clarification. In the non-displayed view object group 516, the <LINK> node is added to the node <my:link> as a child node to set a link from the <LINK> node to the CSS model 509.

A conventional Web page authoring tool constructs the view object tree 514 in a manner to construct only the part related to the displayed view object group 515, excluding the part related to the non-displayed view object group 516.

The following illustrates correspondences among components of the Web page authoring apparatus 200, the Web page authoring method 240, and the Web page authoring tool 410. The DOM information 505 is an example of modeling the managed document 220, while the CSS model 509 is an example of a managed external document 223 to be described later in FIGS. 6 and 8. The view object detected by the view object detecting means 202 and in view object detecting step S242 corresponds to the displayed view object group 515 in the view object tree 514 before application of styles, while the browser-type edit screen data corresponds to the displayed view object group 515 in the view object tree 514 after application of styles.

The DOM information 505 and the CSS model 509 are synchronized with the edited content of the document V and the CSS model 509 on the browser-type edit screen 411. The edited content of the document V and the CSS model 509 on the browser-type edit screen 411 are reflected in the DOM information 505 and the CSS model 509, and then in the view object tree 514.

Figure 16:
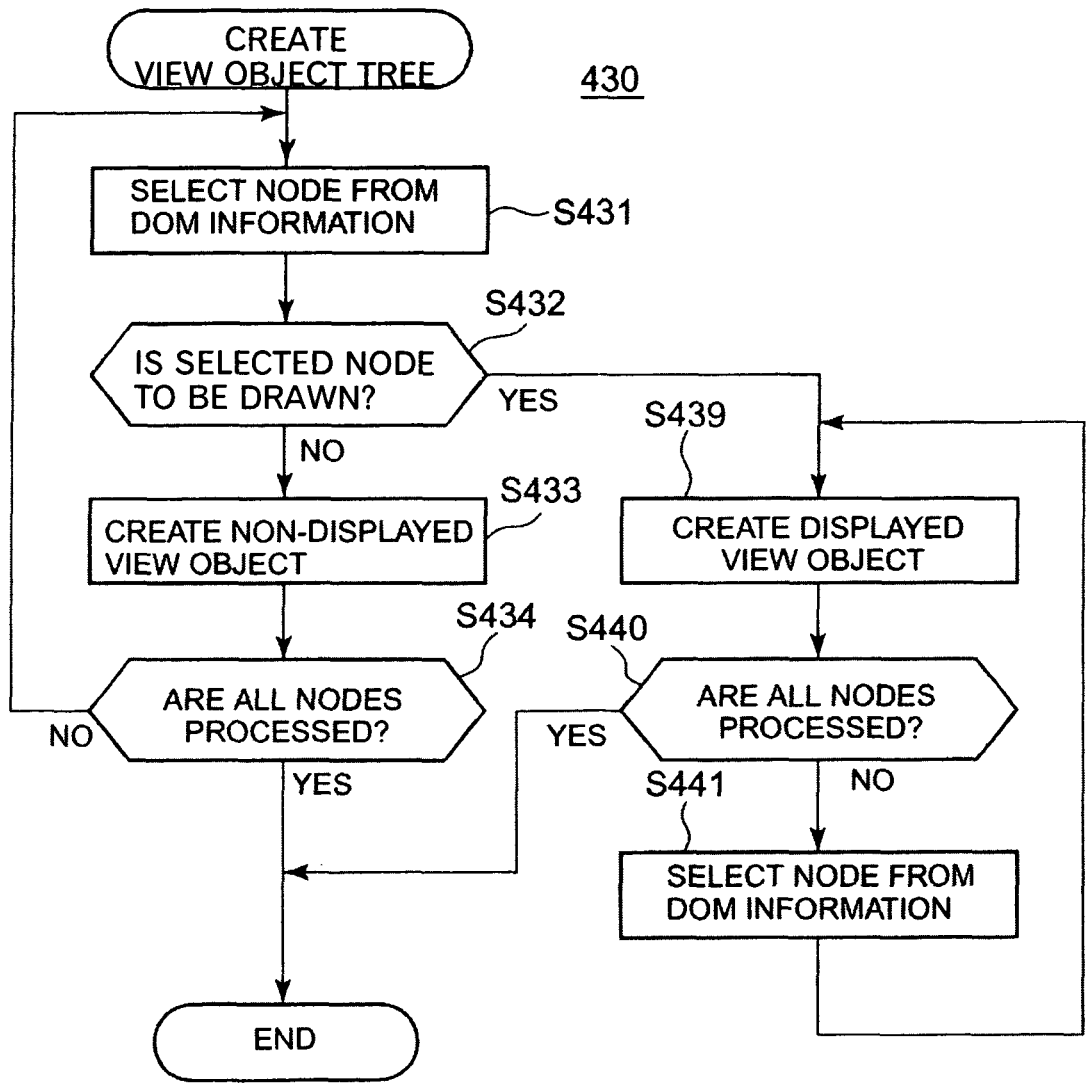
FIG. 16 is a flowchart of a method of creating a view object tree.

FIG. 16 is a flowchart of a method 430 of creating the view object tree 514. The document node (#document) as the root node of the DOM information 505 is set as the root node of the view object tree 514 without subjected to processing in the creation method 430. In step S431, a node is selected from the DOM information 505. The node selection in step S431 and step S441 to be described later is performed in the depth first order starting from the document in the DOM information 505. In step S432, it is determined whether the node selected in S431 is to be drawn on the browser-type edit screen 411. If the determination result is NO, the procedure goes to step S433, while if it is YES, the procedure goes to step S439.

In step S433, the selected node is added to the non-displayed view object group 516 as a node in the non-displayed view object group 516. In step S434, it is determined whether all the nodes in the DOM information 505 were processed. If it is determined that all the nodes were processed, the creation method 430 is ended, while if it is determined that at least one node remains unprocessed, the procedure returns to step S431.

In step S439, the selected node is added to the displayed view object group 515 as a node in the displayed view object group 515. In step S440, it is determined whether all the nodes in the DOM information 505 were processed like in step S434. If it is determined that all the nodes were processed, the creation method 430 is ended, while if it is determined that at least one node remains unprocessed, the procedure goes to step S441. In step S441, an unprocessed node is selected from the DOM information 505. In this method, the procedure goes to step S441, rather than returning to step S431 when the determination result in step S440 is NO. This is because, when a BODY node is selected from the DOM information 505 in the depth first order, other nodes selected after the selection of the BODY node are all descendants of the BODY node, that is, they are the nodes to be drawn.

Figure 17:
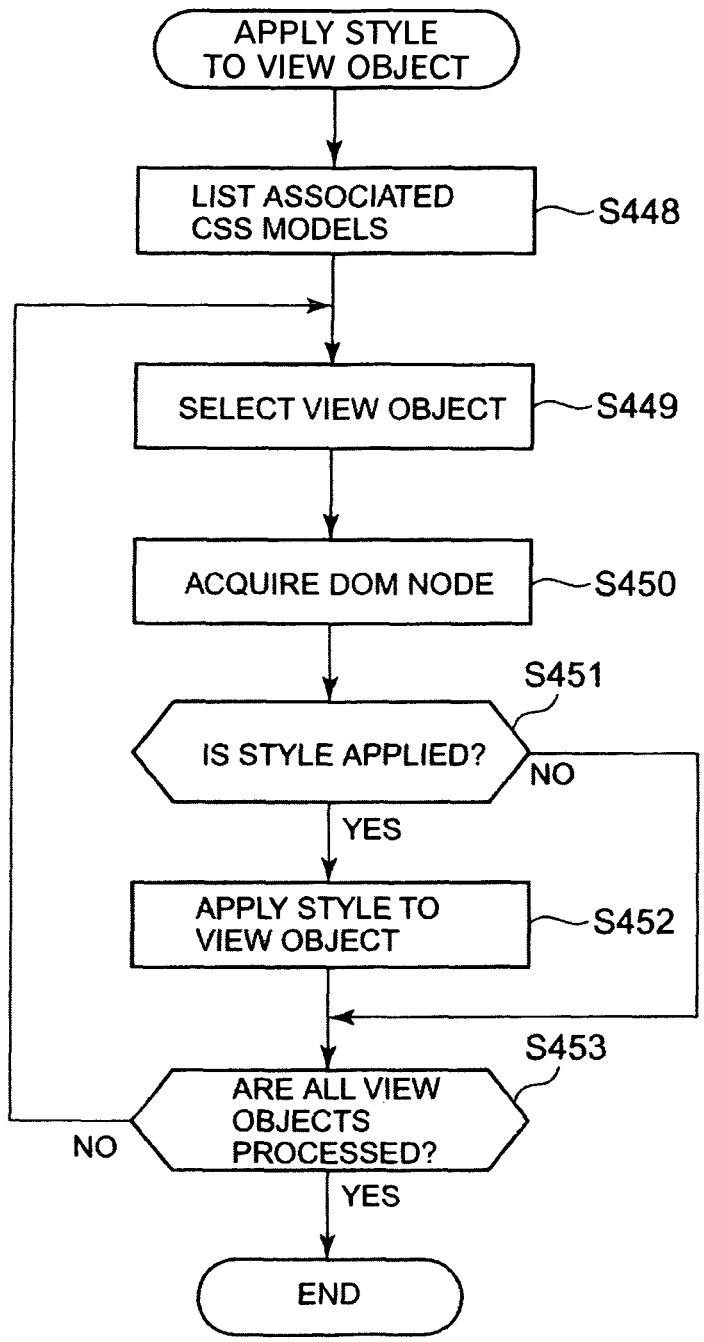
FIG. 17 is a flowchart of a method of applying a style to the view object tree.

FIG. 17 is a flowchart of a method 445 of applying styles to the view object tree 514. The styles to be processed in the application method 445 correspond to indirect styles. A method of applying direct styles is generally performed before the application method 445. In step S448, all CSS models 509 loaded in association with the document V are listed. Note that, since the number of CSS models 509 is one in the example of FIG. 15, the number of CSS models 509 listed in step 448 is also one. In step S449, a view object is selected based on the view object tree 514. In step S450, a style specifying node is acquired from the nodes in the non-displayed view object group 516. Then, in step S451, it is determined whether the style of the style specifying node acquired in step S450 is applied to the node selected in step S449. If the determination result in step S451 is YES, the procedure goes to step S452, while if it is NO, the procedure goes to step S453.

In step S452, the style of the style specifying node is applied to the selected view object. In step S453, it is determined whether all the view objects are checked for the application of styles. If the determination result is YES, the application method 445 is ended, while if it is NO, the procedure returns to step S449. Thus, when the application of a style to a view object in the displayed view object group 515 is determined from the HEAD section, the style is applied to the view object.

The Web page authoring tool 410 draws the browser-type edit screen 411 based on the displayed view object group 515 after application of styles. A drawing node tree 520 (FIG. 15) shows conceptually display content on the browser-type edit screen 411. H1 and P nodes are given a horizontal-striped pattern for convenience sake to indicate clearly that the style of the CSS model 509 is applied to them. This allows the author to edit the document V while viewing the browser-type edit screen 411, for example, corresponding to the drawing node tree 520. The editing work may include the editing of indirect styles as well as the editing of direct styles. In the Web page authoring tool 410, the editing of direct styles corresponds to editing related to nodes belonging to the displayed view object group 515 for processing tags belonging to the BODY section of the document V. The editing of indirect styles corresponds to editing related to nodes belonging to the non-displayed view object group 516 and the CSS model 509. A method of editing indirect styles will next be described with reference to FIG. 18.

Figure 18:
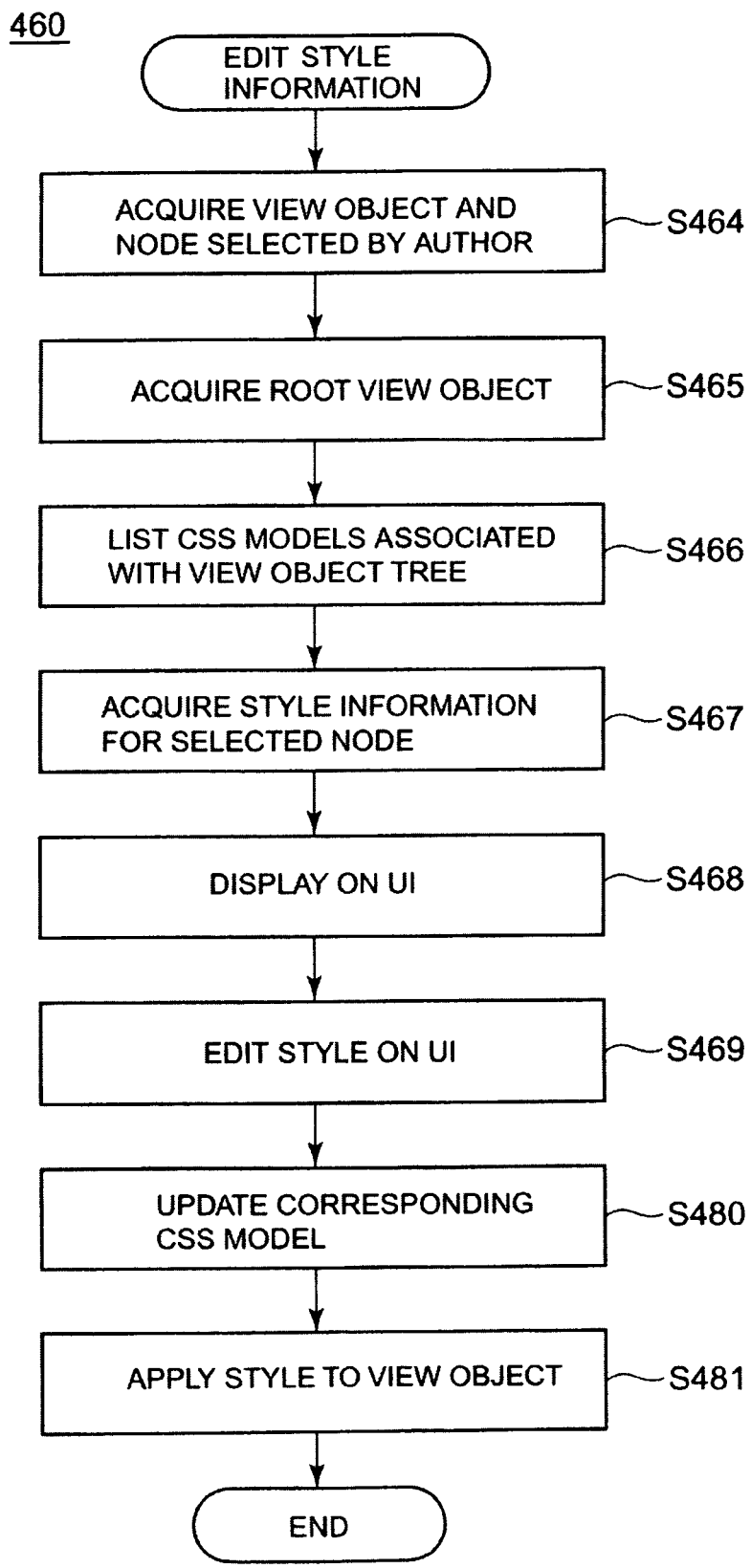
FIG. 18 is a flowchart of a method of editing style information.

FIG. 18 is a flowchart of an editing method 460 for style information. In step S464, a view object selected by the author on the browser-type edit screen 411 for style editing, and a node corresponding to the view object in the displayed view object group 515 are acquired. In step S465, a root node (#document in the view object tree 514 of FIG. 15) which includes the acquired view object as its descendant is acquired. This allows the Web page authoring tool 410 to grasp the nodes in the non-displayed view object group 516.

In step S466, all the CSS models 509 in the view object tree 514 associated with the document V are listed. In the example of FIG. 15, the number of CSS models 509 is one. In step S467, style information for the node selected by the author on the browser-type edit screen 411 as the one to be edited is acquired from the CSS models 509. Based on the style information acquired in step S467, a dialog or the like is displayed on the browser-type edit screen 411 as a UI (User Interface) based on the style information acquired in S467. In step S469, the author edits the style on the UI. In step S480, the content of the CSS model 509 on which the style editing was performed is updated based on the editing in step S469. In step S481, the style obtained after the update of the CSS model 509 is applied to the view object.

Returning to FIGS. 5 and 7, additional functions and processing steps of the Web page authoring apparatus 200 and the Web page authoring method 240 will be described.

In order to match the browser-type edit screen data with the edited content on the browser-type edit screen 221, the browser-type edit screen data generating means 205 updates the browser-type edit screen data based on the content of the managed document 220 updated by synchronizing the content of the managed document 220 with the edited content on the browser-type edit screen 221. Similarly, in step S245, in order to match the browser-type edit screen data with the edited content on the browser-type edit screen 221, the browser-type edit screen data is updated based on the content of the managed document 220 updated by synchronizing the content of the managed document 220 with the edited content on the browser-type edit screen 221.

The following describes a typical example of the process to reflect, in the browser-type edit screen 221, the content edited by the author on the browser-type edit screen 221:

(a) The content of editing done by the author on the browser-type edit screen 221 is reflected in the content of the corresponding managed document 220. At this moment, the browser-type edit screen 221 is not changed yet.

(b) The Web page structure information is updated based on the updated content of the managed document 220.

(c) The browser-type edit screen data is updated to update the browser-type edit screen 221.

Figure 6:
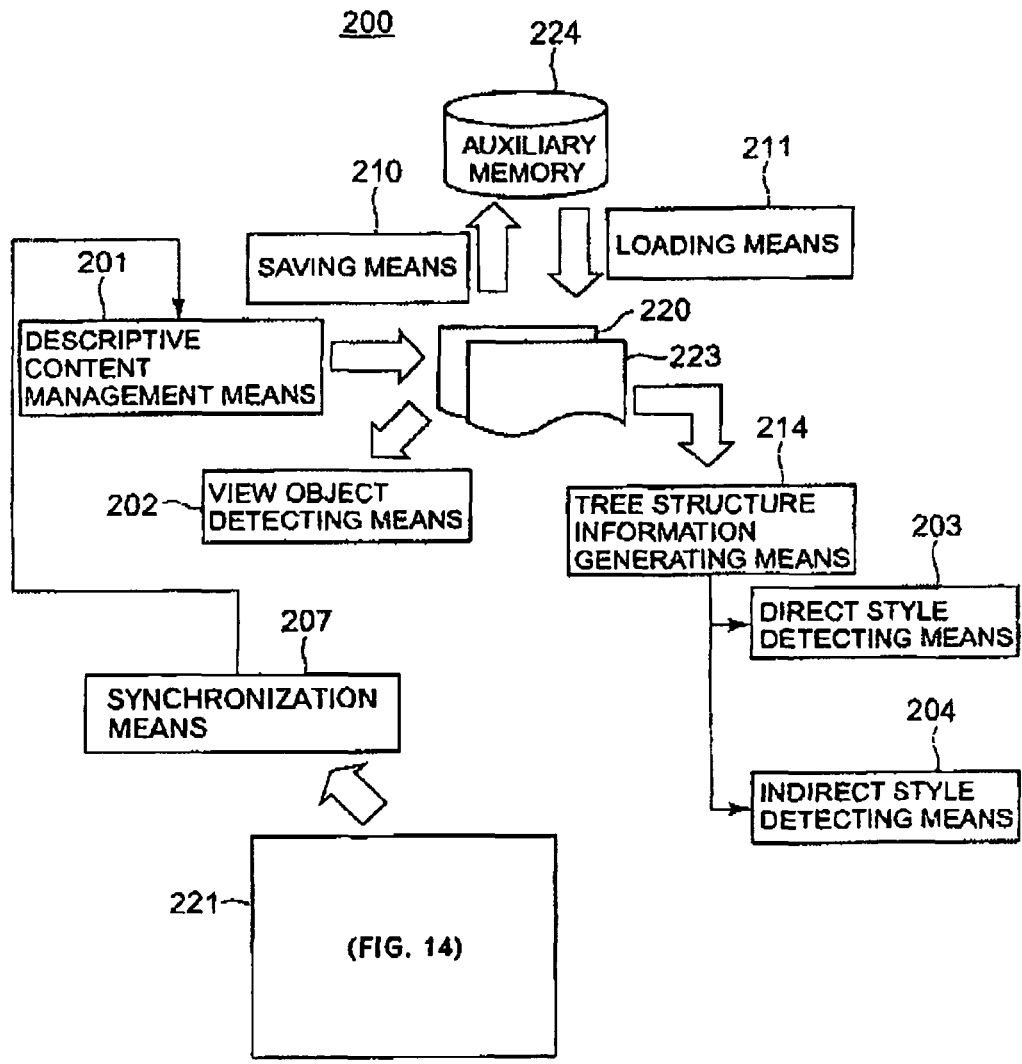
FIG. 6 is a functional block diagram of the main part of the second Web page authoring apparatus with additional functions.
Figure 8:
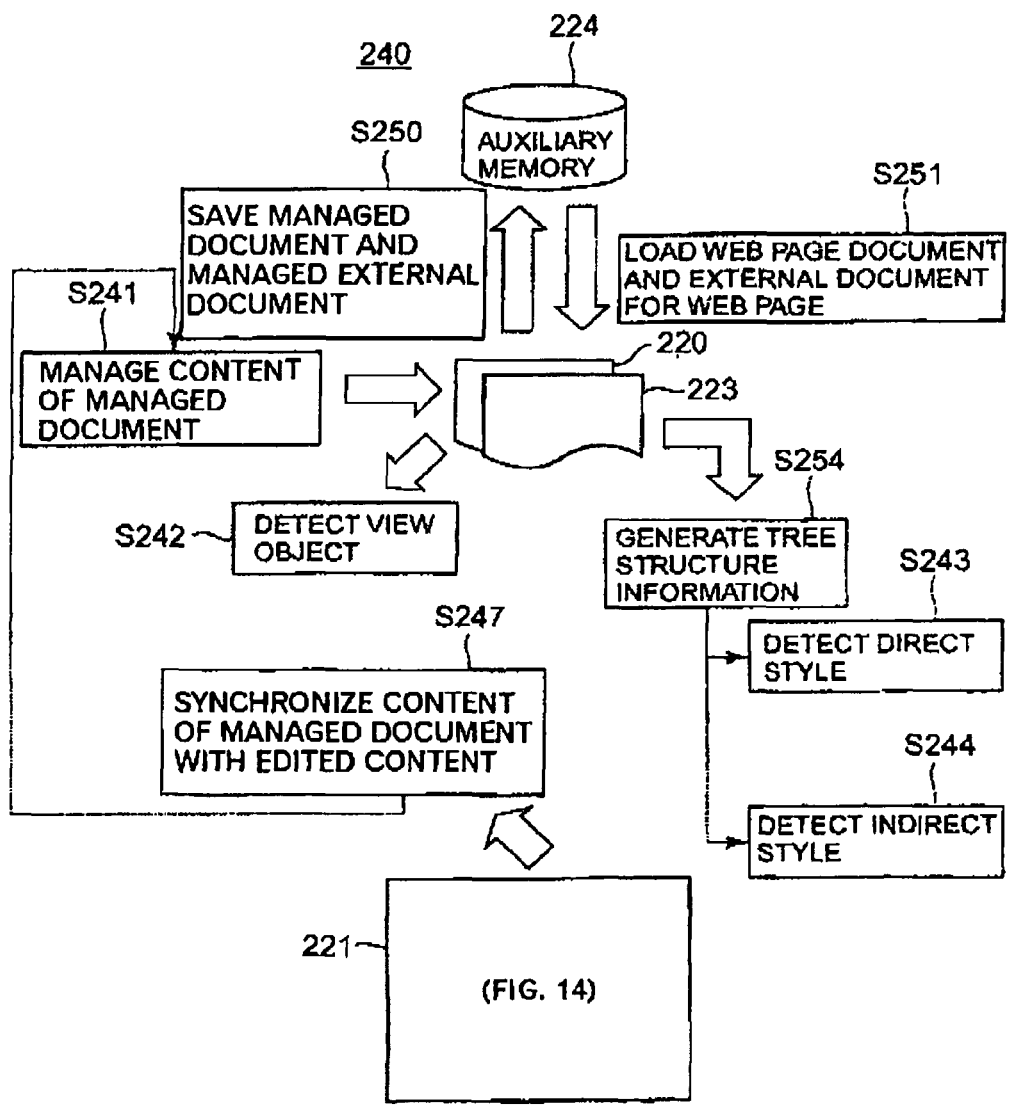
FIG. 8 is a flowchart of the main part of the second Web page authoring method with additional processing steps.

FIG. 6 is a functional block diagram of the main part of the Web page authoring apparatus 200, showing additional functions. The descriptive content management means 201 manages the descriptive content of the external document 222 (FIG. 5) as a managed external document 223 (FIG. 6). The synchronization means 207 synchronizes the content of the managed external document 223 with the content of the managed external document 223 edited on the browser-type edit screen 221 based on the editing operations on the browser-type edit screen 221. FIG. 8 is a flowchart of the main part of the Web page authoring method 240, showing additional processing steps. In step S241, the descriptive content of the external document 222 is managed as a managed external document 223. Thus, not only can the style of an external document be reflected in the display of a corresponding view object on the browser-type edit screen 221, but also the content of the external document edited on the browser-type edit screen 221 can be reflected in the external document.

Saving means 210 saves the managed document 220 and the managed external document 223 into the auxiliary memory 224. Loading means 211 loads the Web page document and external document related to the style of the Web page document from the auxiliary memory 224 prior to start of editing. The descriptive content management means 201 manages the descriptive content of the loaded Web page document and external document as the managed document 220 and the managed external document 223, respectively. Similarly, in saving step S250, the managed document 220 and the managed external document 223 are saved in the auxiliary memory 224. Also, in loading step S251, the Web page document and external document related to the style of the Web page document are loaded from the auxiliary memory 224 prior to start of editing. Then, in step S241, the descriptive content of the loaded Web page document and external document is managed as the managed document 220 and the managed external document 223, respectively. Thus, not only can style content edited on the browser-type edit screen 221 be saved properly in the auxiliary memory 224, but also the Web page document and external document related to the style can be loaded properly and reedited at the time of reediting.

Returning to FIGS. 5 and 7, when such an editing operation as to create a new external document is performed on the browser-type edit screen 221, the synchronization means 207 synchronizes the creation of a new managed external document 223 with the creation of the new external document on the browser-type edit screen 221 in order to create the managed external document 223 corresponding to the external document. Similarly, in step S247, when such an editing operation as to create a new external document is performed on the browser-type edit screen 221, the creation of a new managed external document 223 is synchronized with the creation of the new external document on the browser-type edit screen 221 in order to create the managed external document 223 corresponding to the external document.

In the Web page authoring apparatus 200 of FIG. 6, tree structure information generating means 214 generates tree structure information related to nodes of the managed document 220 based on the descriptive content of the managed document 220. The view object detecting means 202 detects a view object of the managed document based on corresponding information in the BODY section of the tree structure information. The direct style detecting means 203 detects, as a direct style, a style directly specified in the tree structure information. The indirect style detecting means 204 searches for an external document specified by corresponding information in the HEAD section of the tree structure information to detect, as an indirect style, a style described in the external document.

Similarly, in the Web page authoring method 240 of FIG. 8, tree structure information related to the nodes of the managed document 220 is generated in tree structure information generating step S254 based on the descriptive content of the managed document 220. In view object detecting step S242, a view object of the managed document is detected based on corresponding information in the BODY section of the tree structure information. In direct style detecting step S243, a style directly specified in the tree structure information is detected as a direct style. In indirect style detecting step S244, an external document specified by corresponding information in the HEAD section of the tree structure information is searched for to detect, as an indirect style, a style described in the external document.

In the Web page authoring apparatus 200 (FIGS. 5 and 6) and the Web page authoring method 240 (FIGS. 7 and 8), the browser-type edit screen 221 is such that the direct and indirect styles are applied to the view objects related to a single managed document 220. However, when two or more managed documents 125 are collectively edited on the browser-type edit screen 128 of the Web page authoring apparatus 100 (FIGS. 1 and 2) and the Web page authoring method 140 (FIGS. 3 and 4), each of the managed documents 125 can be handled as the managed document 220 in the Web page authoring apparatus 200 and the Web page authoring method 240, so that the browser-type edit screen 128 of the collective editing type can be used as such a browser-type edit screen as to apply the direct and indirect styles to the view objects of each managed document 125.

Figure 19:
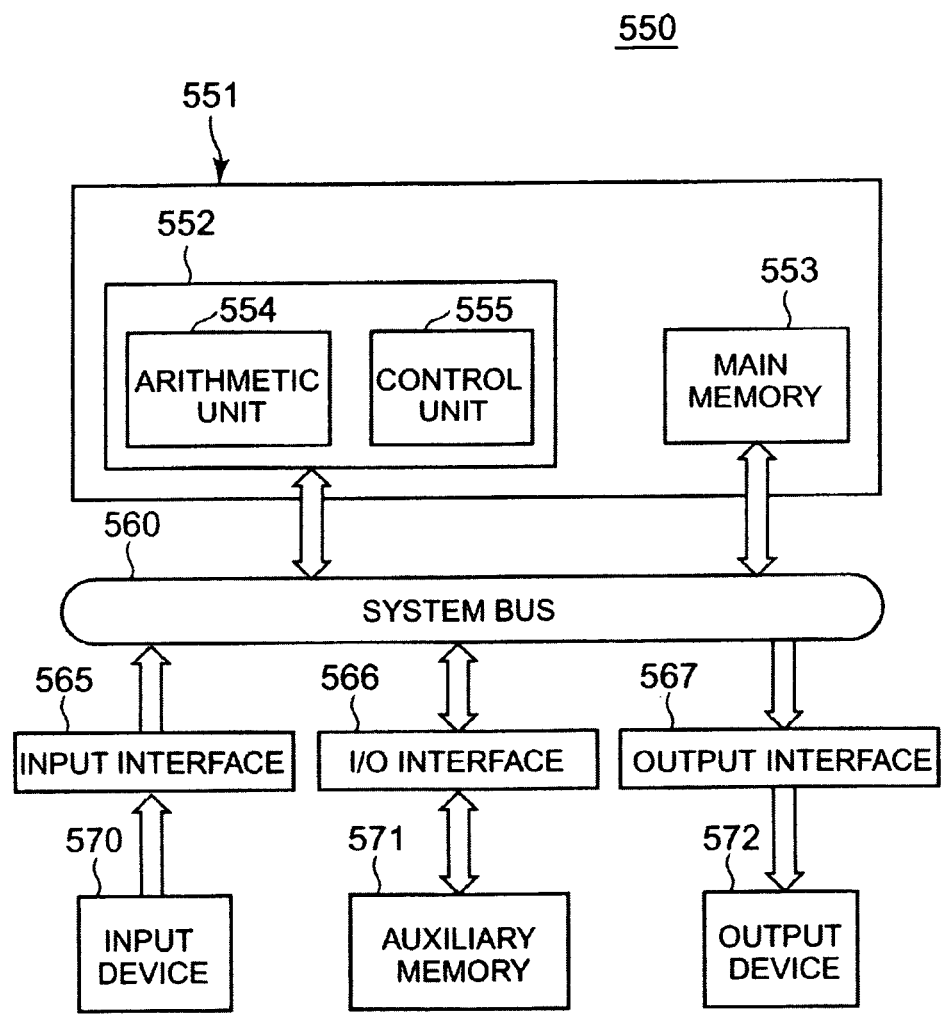
FIG. 19 is a schematic block diagram of a computer in which a program of the present invention is implemented.

FIG. 19 is a schematic block diagram of a computer 550 on which a program of the present invention is implemented. A Web page authoring program of the present invention causes the computer 550 to function as the respective means of the Web page authoring apparatus 100. Alternatively, a Web page authoring program of the present invention causes the computer 550 to execute respective processing steps of the Web page authoring method 140.

The present invention can be implemented in hardware, software, or a combination thereof. As a typical example of a combination of hardware and software, the present invention is implemented in a computer system with a predetermined program. In this case, the predetermined program is loaded and executed in the computer system to control the computer system to execute the processing operations according to the present invention. This program consists of a set of instructions that can be represented in any language, code, and notation. The set of instructions allows the computer system to execute specific functions directly or after either or both of (a) transformation into another language, code, or notation, and (b) duplication onto another medium. In addition to the program itself, a medium recording the program and a program product are also included within the scope of the present invention. The program executing the functions of the present invention can be stored on any computer-readable medium, such as a flexible disk, MO, CD-ROM, DVD, hard disk, ROM, MRAM, or RAM. The program of the present invention can also be stored on a recording medium by downloading it from another computer system connected through a communication line, or duplicating it from another recording medium. Further, the program of the present invention can be stored on one or more recording media by compressing or dividing it into two or more program components.

As shown in FIG. 19, a computer main body 551 includes a CPU 552 and a main memory 553. The CPU 552 includes an arithmetic unit 554 and a control unit 555. The arithmetic unit 554 performs calculations, comparison, determination, etc., while the control unit 555 controls the main memory 553, the arithmetic unit 554, etc. A system bus 560 consists of a data bus, an address bus, and a control bus to connect the CPU 552, the main memory 553, an input interface 565, an I/O interface 566, and an output interface 567. An input device 570 includes, for example, a keyboard, a read-only CD drive, etc. to send data to the system bus 560 through the input interface 565. An auxiliary memory 571 is, for example, an HDD (hard disk drive) or a CD-R/W drive to exchange data with the system bus 560 through the I/O interface 566. An output device 572 includes, for example, a display and a printer to receive data from the system bus 560 through the output interface 567. The program of the present invention is stored, for example, in the auxiliary memory 571 such as an HDD, and read into the main memory 553 to execute the functions.

The invention claimed is:

1. A method for managing descriptive content of a managed document for a Web page to be edited, the method comprising:
   a computer authoring the managed document for the Web page to include a Document Object Model (DOM) list, wherein the DOM list contains DOM information for the managed document and embed-related nodes associated with embed-related code in the managed document and link information to child documents embedded in the managed document by the embed-relate code:
   a computer generating tree structure information related to nodes of the managed document based on a description of the managed document;
   the computer identifying, from the description of the managed document, an object to be displayed on a browser screen as a view object based on information in a body section of the tree structure information;
   the computer identifying a direct style based on the description of the managed document specified in the tree structure information; and
   the computer identifying an indirect style in an external document specified by information in a head section of a tree section of the tree structure information;
   the computer generating edit screen data based on an association between the view object, the direct style, and the indirect style to generate an edit screen on which a tag content of the managed document is converted to a visual representation, wherein the edit screen data includes at least a portion of the tree structure information comprising DOM information in the DOM list that represents the view object as a view object tree;
   the computer generating the edit screen based on the edit screen data; and
   the computer synchronizing the descriptive content of the managed document with edited content on the edit screen based on editing operations on the edit screen, wherein in response to specified edited content resulting from a specified editing operation, in the DOM list is updated in corresponding relationship with the specified edited content, and then the view object tree is updated in corresponding relationship with the updated DOM information in the DOM list, and further wherein the updating takes place instantaneously.

2. The method of claim 1, further comprising:
   the computer providing, responsive to receiving the updated view object tree, a viewable image of the view object as modified by the specified edited content on an output device.

3. The method of claim 2 further comprising:
   the computer, responsive to an editing operation creating a new external document on the edit screen, synchronizing a new managed external document with a new external document on the edit screen in order to create the managed external document corresponding to the external document.

4. The method of claim 3, wherein the edit screen is a browser-type edit screen.

5. The method of claim 1, wherein the edited content is an indirect style detected from a description of an external document.

6. A system for managing descriptive content of a managed document for a Web page to be edited, the system comprising:
   one or more processors, one or more computer readable memories, and one or more computer readable storage devices;
   computer program instructions stored in at least one computer readable storage device for execution by at least one processor via at least one computer readable memory to author the managed document for the Web page to include a Document Object Model (DOM) list, wherein the DOM list contains DOM information for the managed document and embed-related nodes associated with embed-related code in the managed document and link information to child documents embedded in the managed document by the embed-relate code:
   computer program instructions stored in the at least one computer readable storage device for execution by the at least one processor via the at least one computer readable memory for generating tree structure information related to nodes of the managed document based on a description of the managed document;
   computer program instructions stored in the at least one computer readable storage device for execution by the at least one processor via the at least one computer readable memory for identifying, from the description of the managed document, an object to be displayed on a browser screen as a view object based on information in a body section of the tree structure information;
   computer program instructions stored in the at least one computer readable storage device for execution by the at least one processor via the at least one computer readable memory for identifying a direct style based on the description of the managed document specified in the tree structure information;
   computer program instructions stored in the at least one computer readable storage device for execution by the at least one processor via the at least one computer readable memory for identifying an indirect style in an external document specified by information in a head section of a tree section of the tree structure information;
   computer program instructions stored in the at least one computer readable storage device for execution by the at least one processor via the at least one computer readable memory for generating edit screen data based on an association between the view object, the direct style, and the indirect style to generate an edit screen on which a tag content of the managed document is converted to a visual representation, wherein the edit screen data includes at least a portion of the tree structure information comprising DOM information in the DOM list that represents the view object as a view object tree;

computer program instructions stored in the at least one computer readable storage device for execution by the at least one processor via the at least one computer readable memory for generating the edit screen based on the edit screen data; and computer program instructions stored in the at least one computer readable storage device for execution by the at least one processor via the at least one computer readable memory for synchronizing the descriptive content of the managed document with edited content on the edit screen based on editing operations on the edit screen, wherein in response to specified edited content resulting from a specified editing operation, the DOM information in the DOM list is updated in corresponding relationship with the specified edited content, and then the view object tree is updated in corresponding relationship with the updated DOM information in the DOM list, and further wherein the updating takes place instantaneously.

7. The system of claim 6, further comprising:

computer program instructions stored in the at least one computer readable storage device for execution by the at least one processor via the at least one computer readable memory for receiving the updated view object tree and providing a viewable image of the view object as modified by the specified edited content on an output device.

8. The system of claim 7 further comprising:

computer program instructions stored in the at least one computer readable storage device for execution by the at least one processor via the at least one computer readable memory, responsive to an editing operation creating a new external document on the edit screen, synchronizing a new managed external document with a new external document on the edit screen in order to create the managed external document corresponding to the external document.

9. The system of claim 8, wherein the edit screen is a browser-type edit screen.

10. The system of claim 6, wherein the edited content is an indirect style detected from a description of an external document.

11. A non-transitory computer readable storage medium having a computer program product encoded thereon for managing descriptive content of a managed document for a Web page to be edited, the computer program product comprising:

computer program instructions stored in the non-transitory computer readable storage medium for authoring the managed document for the Web page to include a Document Object Model (DOM) list, wherein the DOM list contains DOM information for the managed document and embed-related nodes associated with embed-related code in the managed document and link information to child documents embedded in the managed document by the embed-relate code:

computer program instructions stored in the non-transitory computer readable storage medium for generating tree structure information related to nodes of the managed document based on a description of the managed document;

computer program instructions stored in the non-transitory computer readable storage medium for identifying, from the description of the managed document, an object to be displayed on a browser screen as a view object based on information in a body section of the tree structure information;

computer program instructions stored in the non-transitory computer readable storage medium for identifying a direct style based on the description of the managed document specified in the tree structure information;

computer program instructions stored in the non-transitory computer readable storage medium for identifying an indirect style in an external document specified by information in a head section of a tree section of the tree structure information;

computer program instructions stored in the non-transitory computer readable storage medium for generating edit screen data based on an association between the view object, the direct style, and the indirect style to generate an edit screen on which a tag content of the managed document is converted to a visual representation, wherein the edit screen data includes at least a portion of the tree structure information comprising DOM information in the DOM list that represents the view object as a view object tree;

computer program instructions stored in the non-transitory computer readable storage medium for generating the edit screen based on the edit screen data; and computer program instructions stored in the non-transitory computer readable storage medium for synchronizing the descriptive content of the managed document with edited content on the edit screen based on editing operations on the edit screen, wherein in response to specified edited content resulting from a specified editing operation, the DOM information in the DOM list is updated in corresponding relationship with the specified edited content, and then the view object tree is updated in corresponding relationship with the updated DOM information in the DOM list, and further wherein the updating takes place instantaneously.

12. The non-transitory computer readable storage medium of claim 11, further comprising:

computer program instructions stored in the non-transitory computer readable storage medium for execution by at least one processor via at least one computer readable memory for receiving the updated view object tree and providing a viewable image of the view object as modified by the specified edited content on an output device.

13. The non-transitory computer readable storage medium of claim 12 further comprising:

computer program instructions stored in the non-transitory computer readable storage medium, responsive to an editing operation creating a new external document on the edit screen, synchronizing a new managed external document with a new external document on the edit screen in order to create the managed external document corresponding to the external document.

14. The non-transitory computer readable storage medium of claim 13, wherein the edit screen is a browser-type edit screen.

15. The non-transitory computer readable storage medium of claim 11, wherein the edited content is an indirect style detected from a description of an external document.

\* \* \* \* \*